United States Patent

Takahama et al.

[11] Patent Number: 5,861,982
[45] Date of Patent: Jan. 19, 1999

[54] OPTICAL-PATH SWITCHING APPARATUS, OPTICAL-DEVICE SWITCHING APPARATUS FOR OPTICAL MICROSCOPE AND LOCKING APPARATUS FOR USE IN TRANSPORTING OPTICAL MICROSCOPE

[75] Inventors: Yasuteru Takahama, Hachioji; Kenji Karaki, Ina, both of Japan

[73] Assignee: Olympus Optical Co., Ltd., Tokyo, Japan

[21] Appl. No.: 663,668

[22] Filed: Jun. 14, 1996

[30] Foreign Application Priority Data

Jun. 23, 1995 [JP] Japan .................................. 7-157627
Jul. 13, 1995 [JP] Japan .................................. 7-177485

[51] Int. Cl.⁶ .............................. G02B 21/00; G02B 7/02
[52] U.S. Cl. ........................................ 359/381; 359/821
[58] Field of Search .................................. 359/381, 821, 359/889

[56] References Cited

U.S. PATENT DOCUMENTS

| | | |
|---|---|---|
| 2,684,611 | 7/1954 | Hinden . |
| 2,687,669 | 8/1954 | Bolsey . |
| 3,868,714 | 2/1975 | Muryoi .................................. 396/297 |
| 4,368,947 | 1/1983 | Yoshinaga et al. ..................... 359/381 |
| 4,544,236 | 10/1985 | Endo ...................................... 359/821 |
| 4,852,955 | 8/1989 | Doyle et al. ............................ 359/355 |
| 4,961,636 | 10/1990 | Gaul et al. .............................. 359/381 |
| 5,517,353 | 5/1996 | Ikoh et al. .............................. 359/388 |

FOREIGN PATENT DOCUMENTS

| | | |
|---|---|---|
| 56-36614 | 4/1981 | Japan . |
| 63-45566 | 9/1988 | Japan . |

*Primary Examiner*—Cassandra C. Spyrou
*Assistant Examiner*—Mark A. Robinson
*Attorney, Agent, or Firm*—Frishauf, Holtz, Goodman, Langer & Chick

[57] ABSTRACT

An optical-path switching apparatus for an optical microscope, which is simple structure, has a plurality of optical devices to be inserted and removed to and from at least two or more switching positions provided for optical paths so as to switch the optical paths. A drive force generator generates a drive force, and an insertion/removal device transmits the drive force generated by the drive force generator so as to insert and remove the plural optical devices to and from the switching positions while relating the plural optical devices to one another. A control unit controls switching of the optical devices to be performed by the insertion/removal device in order to obtain a required optical path.

24 Claims, 15 Drawing Sheets

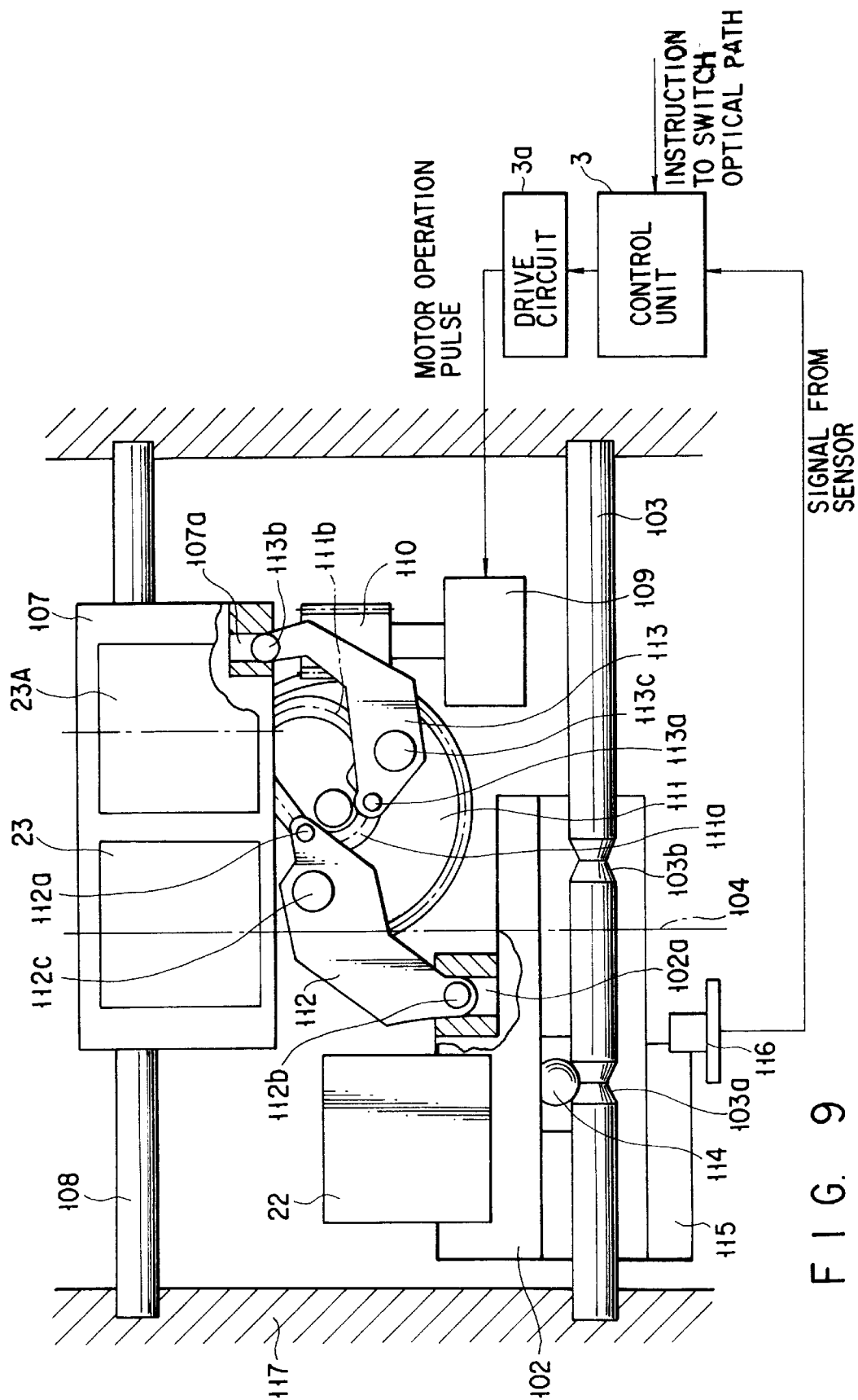
F I G. 9

| OPTICAL PATH \ PRISM | POLARIZING PRISM | BENDING PRISM | CORRECTION PRISM |
|---|---|---|---|
| 1 (OCULAR LENS) | ○ | (○) | (×) |
| 2 (LOOP) | × | ○ | × |
| 3 (TV) | × | × | ○ |

○ : STATE WHERE INSERTE INTO OPTICAL PATH

× : STATE WHERE REMOVED FROM OPTICAL PATH ( ) : EITHER STATE ○ OR × IS PERMITTED

F I G. 11

| OPTICAL PATH \ PRISM | POLARIZING PRISM | BENDING PRISM | CORRECTION PRISM | LOOP |
|---|---|---|---|---|
| 1 (OCULAR LENS) | ○ | (○) | (×) | (○) |
| 2A (LOOP / OCULAR LENS) | × | ○ | × | ○ |
| 2B (LOOP / TV) | × | ○ | × | × |
| 3 (TV) | × | × | ○ | (×) |

F I G. 13

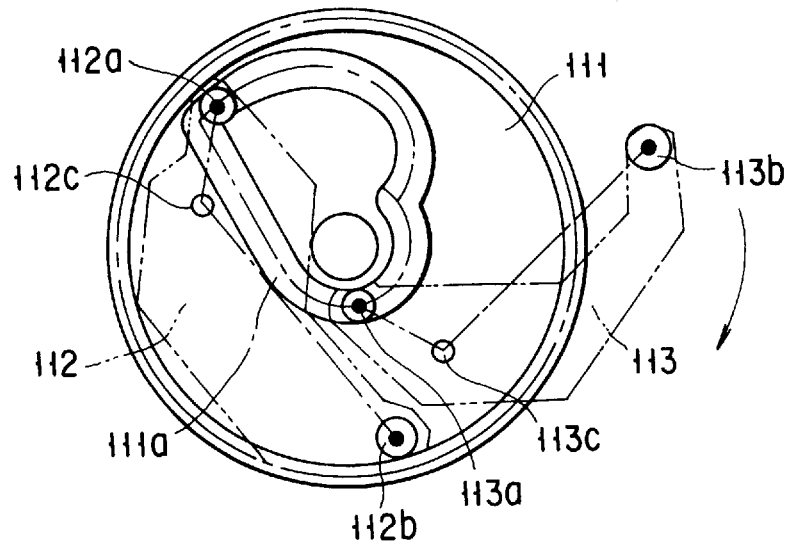
FIG. 12A  OPTICAL PATH 1 (OCULAR)
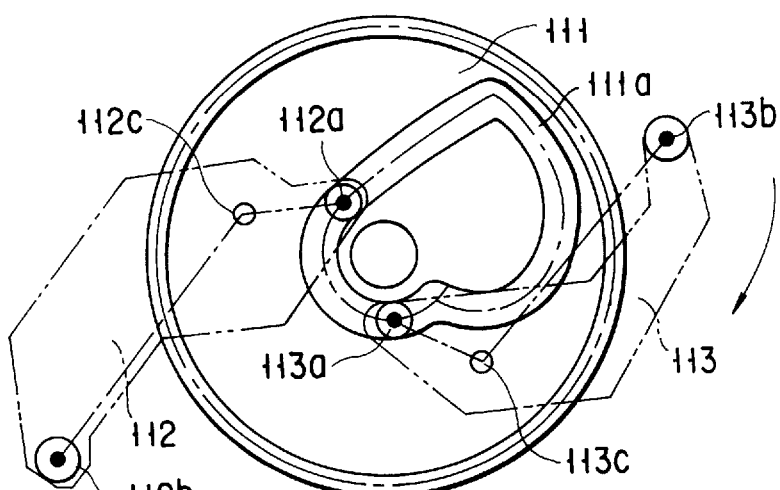
FIG. 12B  OPTICAL PATH 2 (LOOP)
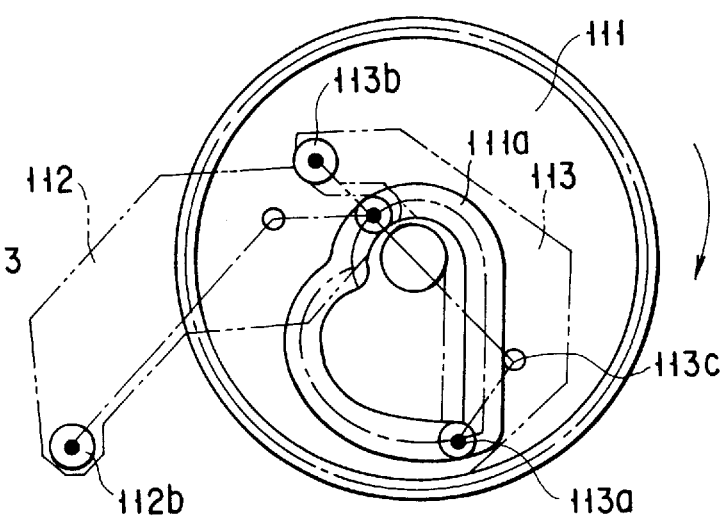
FIG. 12C  OPTICAL PATH 3 (TV)

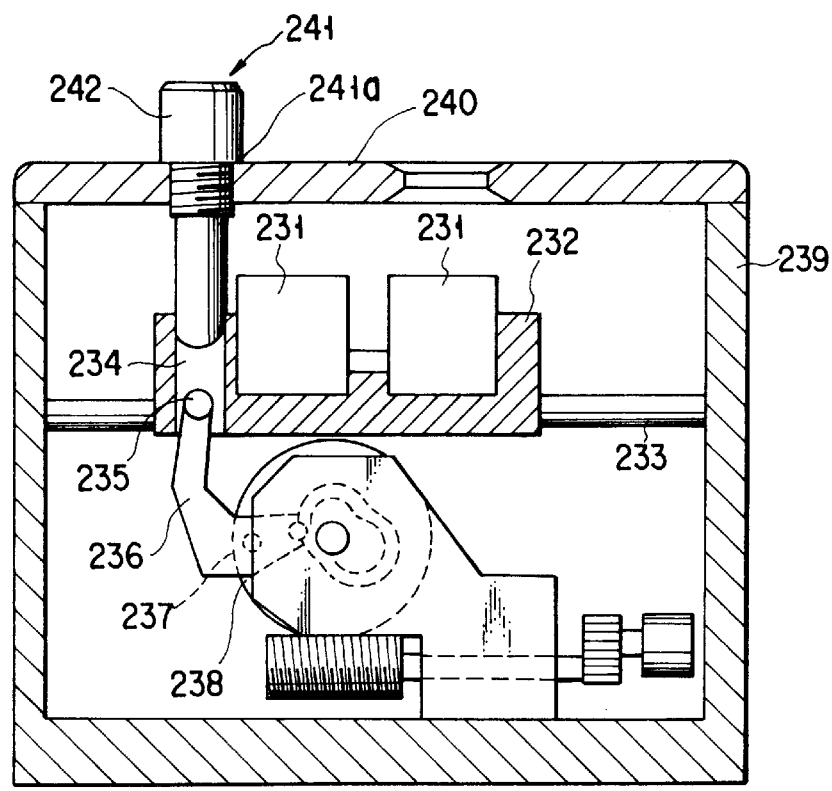
F I G. 20
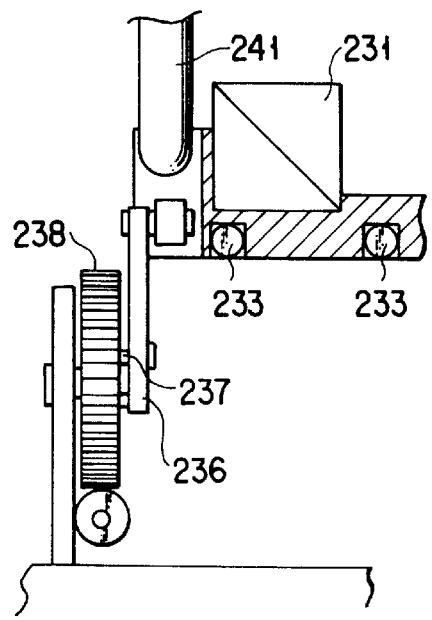
F I G. 21

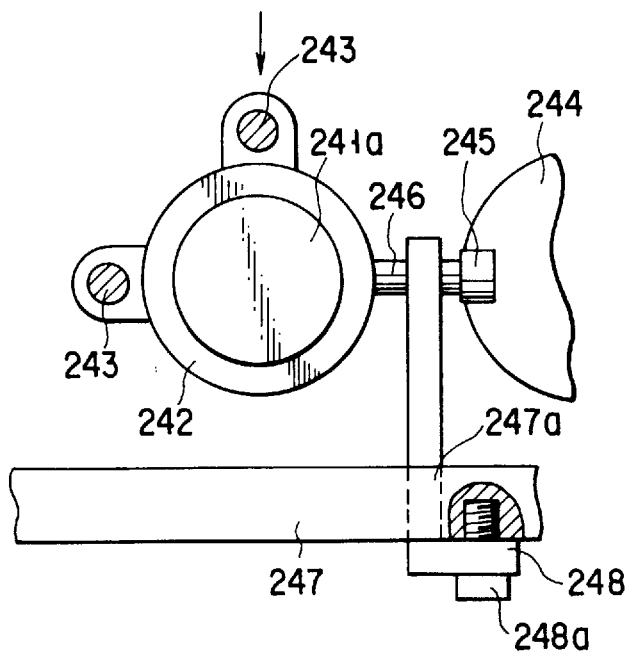
F I G. 22A
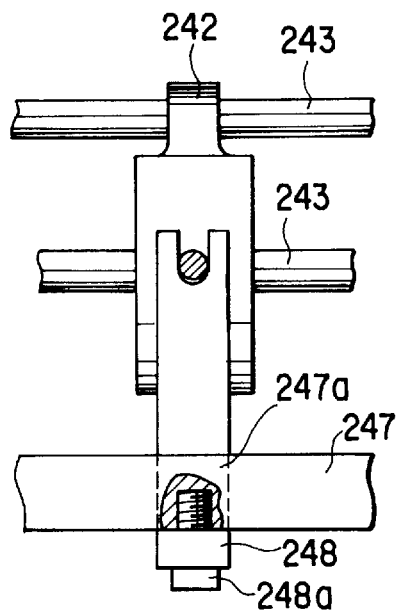
F I G. 22B
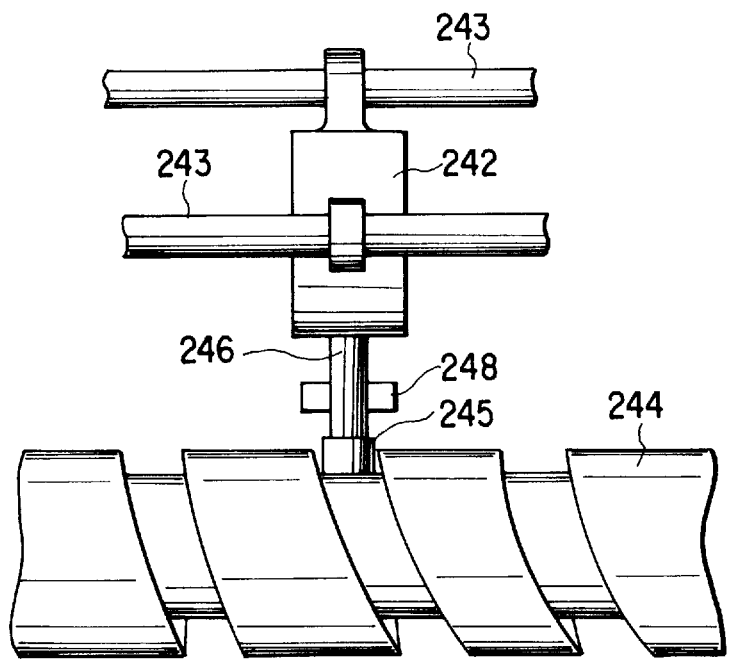
F I G. 22C

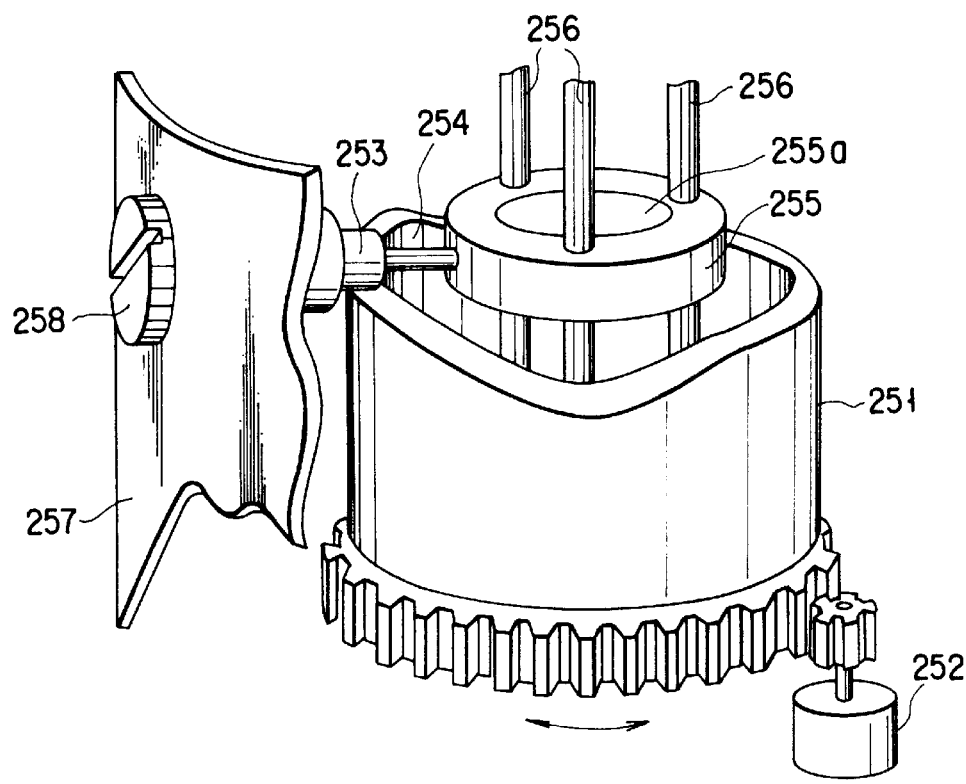
F I G. 23
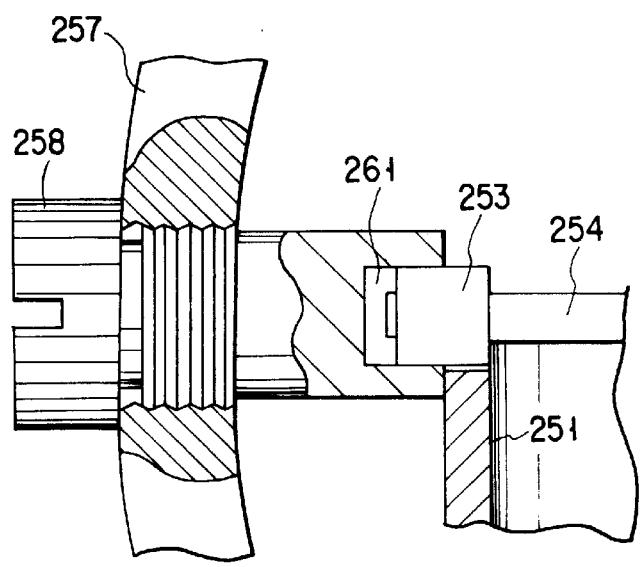
F I G. 24

OPTICAL-PATH SWITCHING APPARATUS, OPTICAL-DEVICE SWITCHING APPARATUS FOR OPTICAL MICROSCOPE AND LOCKING APPARATUS FOR USE IN TRANSPORTING OPTICAL MICROSCOPE

BACKGROUND OF THE INVENTION

1. Field of the Invention

The present invention relates to an optical-path switching apparatus, an optical-device switching apparatus for an optical microscope and a locking apparatus for use in transporting an optical microscope. More particularly, the present invention relates to an optical-path switching apparatus for an optical microscope permitting selection of observation from naked-eye observation through an ocular lens, observation through a TV camera and the like, an optical-device switching apparatus and a locking apparatus for use in transporting an optical microscope.

2. Description of the Related Art

In recent years, lens tubes of a type having a TV optical path have been disclosed which permit a variety of TV cameras to be attached, as well as permitting a naked-eye observation to be performed and a photographing lens to be attached. For example, an optical system for a microscope permitting both naked-eye observation and TV camera observation to be performed has been disclosed, wherein the TV camera has a function to serve as a finder when a photographing operation is performed.

FIG. 1 is a diagram showing the prior art optical system.

The prior art optical system shown in FIG. 1 has a deflection prism 22 for directly introducing light, reflected by or through a specimen S placed on a stage 20 and allowed to pass through an objective lens 21, into ocular lenses 33a and 33b; a plurality of reflecting members 23 to 27 for receiving the light beam from the objective lens 21, and which are disposed to form a loop optical path when the deflection prism 22 is positioned on the outside of the optical path; relay lenses 28 and 29 disposed in the foregoing loop optical path; and a reflecting member or a beam splitter 31 which is allowed to be inserted into a position more rearwards than secondary image-formation position $I_2$ in the loop optical path.

Moreover, the foregoing prior art optical system has a reflecting member 41 for directing the light beam from a position more rearwards than the first image-formation position $I_1$ in the loop optical path to a photographing optical path; reflecting surfaces 34 and 35 for introducing light beams branched by the reflecting member or the beam splitter 31 to the ocular lenses 33a and 33b through a prism 32; a photographing camera 42 disposed on the photographing optical path; and a TV camera 45 disposed on an injection optical path from the loop optical path.

When the following optical devices at three switching positions are inserted or removed with a relation among the following devices being maintained: the deflection prism 22, the reflecting mirror or the reflecting members 23 among the plural reflecting surfaces 23 to 27, which is a reflecting member forming a first reflecting surface, and the reflecting member or the beam splitter 31 positioned more rearwards than the secondary image-formation position $I_2$ in the loop optical path, naked-eye observation, photographing and TV observation can be performed as required. That is, when photographing is performed, either of the naked-eye observation or the TV observation can be selected as the function of a finder.

When the prism 23 has been brought to the outside of the optical path, a correction prism 23A is inserted in place of the prism 23. Thus, light from the objective lens 21 is introduced into the TV camera 45. Note that light allowed to pass through the reflecting member 24 is used to perform a photometry operation and the like.

Since the operation of the microscope having the foregoing multi-functions is complicated, there arises an important requirement for forming the portions for operating the switching positions into electric structures so as to automate all of the sequential operations required to perform a predetermined observation in order to easily operate the optical microscope.

In a case where the microscope disclosed in Japanese Patent Application No. H6-203626 and capable of using all of naked-eye observation, photographing and TV observation is intended to have a structure such that the observation states can electrically be switched, there is the necessity that the following portions are related to one another when electrically operated: a first optical device-switching portion including the deflection prism; a second optical-device switching portion including a reflecting mirror or a prism forming a first reflecting surface among a plurality of reflecting surfaces; and a third optical-device switching portion including the reflecting member or the beam splitter positioned more rearwards than the secondary image-formation position $I_2$ in the loop optical path.

As shown in FIG. 2 which is a control block diagram of the prior art optical-path switching apparatus for an optical microscope, a method for realizing the foregoing structure must comprise operation circuits, actuators, detection circuits, which are disposed corresponding to each switching portion, and a control unit for controlling the foregoing elements while relating the same to one another.

FIG. 3 is a cross sectional view of the optical-device switching apparatus for electrically inserting and removing, with respect to an optical path, optical devices, such as prisms and reflecting mirrors to be used at the switching positions.

Referring to FIG. 3, reference numerals 51a and 51b represent prisms respectively having different functions, and 52 represents a prism holding member for holding the prisms 51a and 51b. Reference numeral 53 represents a guide rod having a click groove for supporting the prism holding member 52, the click groove being arranged to receive a fixing member (not shown) secured to the prism holding member 52. Reference numeral 54 represents a sub guide rod for, together with the guide rod 53, supporting the prism holding member 52.

Reference numeral 55 represents a motor, 56 represents a deceleration mechanism for decelerating rotation of the motor 55, 57 represents a pinion gear and 58 represents rack secured to the prism holding member 52 and arranged to be engaged to the pinion gear 57. Reference numeral 59 represents a slit plate secured to the prism holding member 52. Reference numeral 60 represents a sensor for detecting insertion and removal of the slit plate 59. Reference numeral 61 represents a body for supporting the foregoing guide rod 53, the sub guide rod 54, the motor 55, the pinion gear 57 and the sensor 60.

In the optical-path switching apparatus having the foregoing structure, the sensor 60 detects insertion or removal of the slit plate 59 so that rotation of the motor 55 is interrupted. Simultaneously, the fixing member is received in the click groove. Thus, the optical devices are switched with respect to the optical path and positioned at predetermined positions.

Another optical-path switching apparatus for an optical microscope having a structure as shown in FIG. 4 has been known in Japanese Patent Application KOKAI Publication No. S56-36614.

Referring to FIG. 4, reference numerals 71a, 71b and 71c represent magnifying-power changing lenses, 72 represents a turret plate disposed rotatively around a central axis of the apparatus. The lenses 71a, 71b and 71c are attached to the turret plate 72.

Reference numeral 73 represents a slit plate formed individually from the turret plate 72 and disposed in such a manner that the slit plate 73 can be rotated coaxially with the turret plate 72. The slit plate 73 has, on the outer periphery thereof, a thread portion 73a arranged to be engaged to a pinion 75 of a drive motor 74.

Reference numeral 76 represents a linkage pin secured to the turret plate 72, the linkage pin 76 being received in a cut portion 73b formed in the slit plate 73 so as to be capable of moving within a certain range in the cut portion 73b.

Reference numeral 77 represents a photosensor for detecting slits 73c formed in a flange portion of the slit plate 73 to correspond to magnifying-power changing lenses 71a, 71b and 71c, the photosensor 77 being disposed and secured to detect respective slits immediately before the lenses corresponding to the slits 73c reach predetermined positions.

Reference numeral 78 represents a fixing member arranged to be received in a V-groove 72a formed in the outer periphery of the turret plate 72 to correspond to each power-magnifying lens. The fixing member 78 is urged toward inside of the apparatus by a spring and disposed such that when the rotation of the turret plate 72 is stopped at a position at which the fixing member 78 can be received in the V-groove 72a, the lens corresponding to the V-groove 72a can accurately be positioned at a predetermined position.

Therefore, when the drive motor 74 has been rotated in response to a power-magnifying instruction signal, the slit plate 73 is rotated, the rotation being transmitted to the turret plate 72. When the photosensor 77 has detected a predetermined slit 73c, the rotation of the drive motor 74 is interrupted. Although also the rotation of the slit plate 73 is interrupted simultaneously, the structure of the turret plate 72, permitted to be moved within a certain range, causes the slit plate 73 to continue rotation within the range due to inertia.

When the fixing member 78 has been received in the V-groove 72a, the turret plate 72 is accurately stopped at a predetermined position.

However, to operate the three optical-device switching portions while relating the same in the optical system shown in FIG. 1, plural actuators, operation circuits and detection circuits of the same type are required by the number corresponding to the number of the optical-device switching portions shown in FIG. 2. As a result, there arise problems in that the foregoing elements cannot easily be controlled and that the cost cannot be reduced.

Also a plurality of drive mechanisms are required to correspond to the number of the optical-device switching portions, thus resulting in a problem to arise in that the size of the apparatus being enlarged excessively.

In the case where the optical-device switching portions are formed into electric structures by using the optical-path switching apparatus having a structure as shown in FIG. 3, the rotation of the motor 55 is, through the deceleration mechanism 56, directly transmitted to the prism holding member 52 for holding the prisms 51a and 51b.

Therefore, the distance from the fixing member for stopping the prism holding member 52 at a predetermined position in the optical path to the slit plate 59 to be detected by the sensor 60 is required to accurately be adjusted to stop the prism holding member 52 at a predetermined position by stopping the motor 55 at a predetermined position. Thus, there arises a problem in that adjustment cannot easily be performed.

The magnifying power switching apparatus for an optical microscope shown in FIG. 4 has the structure such that the inertia of weights of a turret plate 72 and magnifying power changing lenses 71a to 71c causes rotation to be performed in a period from detection of a slit 73c formed in a slit plate 73 by a photosensor 77 to fixing of an fixing member 78 into a V-groove 72a formed in the outer portion of the turret plate 72.

However, since the inertia force becomes different due to the weights of the magnifying power changing lenses 71a to 71c, a similar difficulty arises in adjusting the positions of the photosensor 77, the slit plate 73 and the V-groove 72a formed on the outer portion of the turret plate 72.

Although the conventional switching mechanism comprises the mechanical portion having durability against load which is determined in consideration of loads which can be applied at the actual use, loads to be applied in the cases except the actual use, that is, loads to be applied during carrying and transportation of the apparatus have not been considered.

If a mechanism of the foregoing type is intended such that a plurality of switching portions are mechanically connected to one another and driven by one motor, increase in the number of prisms enlarges the weight of the portion to be driven. Therefore, if the apparatus is impacted excessively during carrying or transportation, there arises a risk that the mechanical portion is broken or the accuracy deteriorates.

Since optical devices in an optical unit are accurately adjusted in general, adjustments of the portions in which the optical devices are moved usually are complicated considerably.

An optical-path switching apparatus of a type for electrically switching optical devices thereof is required to have excellent accuracy and reduced load. If the load is reduced, the apparatus can easily be affected from external factors. Thus, there arises a problem in that the movable portions are broken or shifted undesirably due to vibrations or impacts occurring during transportation or the like and, therefore, a required function cannot be obtained.

To prevent the foregoing problems, there has been disclosed a transportation locking apparatus for an optical microscope having a structure as shown in FIG. 5 in which elastic members 84 made of sponge or urethane are inserted between an optical device holding member 82, to which optical devices 81, such as prisms, are secured, and two walls of the casing 83 of the apparatus in such a manner that the elastic members 84 are somewhat compressed so as to absorb external force.

Referring to FIG. 5, reference numeral 86 represents a vertical groove formed in the optical device holding member 82. A rotational force of a motor 87 is transmitted, to the groove 86, through a gear 88 and a cam 89 connected by a worm gear, an arm 90 and a bearing 91. Thus, the arm 90 is rotated around a supporting point 92 so that the optical device holding member 82 is moved.

Although the foregoing method is adaptable to apparatuses of a type in which the movable portion can easily be exposed by opening the cover, a multiplicity of mechanical portions must be decomposed to expose the movable portion because a major portion of optical units has complicated internal mechanisms.

If the foregoing portion has been optically adjusted, the foregoing method cannot be employed in actual practice. The reason for this is that a user is required to remove the elastic members when the apparatus is used, and the user cannot assemble and optically adjust the apparatus.

The foregoing method has another problem in that the optical performance deteriorates due to dusts produced from the elastic members. In general, the inside portion of the optical unit usually is formed into a dust-proofing structure to prevent introduction of dusts. The reason for this is that dusts deteriorate the optical performance of the apparatus. Therefore, use of the elastic members made of sponge or urethane deteriorates the effect of the employed dust-proofing structure.

Another method has been disclosed in which the optical device holding member 82 is directly screw-fixed to an arbitrary surface which is in contact with the optical device holding member 82.

The movable portion of the switching apparatus is usually arranged to be in contact with the external member only on a line or at a point in order to reduce the load. Therefore, foregoing method encounters a problem in that the structure becomes too complicated because a cylindrical member 95 having a flange is, as shown in FIG. 6, inserted into the inside portion of the apparatus to be brought into contact with the bottom surface of the optical device holding member 82 so as to be secured to a casing 83 of the optical unit with screws 96 and then a fixing screw 97 is threaded in a thread hole formed in the optical device holding member 82.

In the case where the foregoing securing method is employed, another problem arises in that the optical device holding member 82 can be deformed when the fixing screw 97 is threaded in if each of the bottom surface of the optical device holding member 82, that of the casing and the member 95 are manufactured accurately.

When the optical device holding member 82 in a state where it is floated in the air is pulled by the screw so as to secure the optical device holding member 82, excessive loads act on the optical device holding member 82 and a guide rod for the optical device holding member 82. In the foregoing case, strain and deformation will take place and, therefore, the optical performance deteriorates.

To secure the optical device holding member 82 by forming a portion which is in contact with the optical device holding member 82 on the surface thereof, a method may be employed in which the apparatus is decomposed and the portion is fixed in the inside portion of the apparatus with screws or another method may be employed in which a member having a movable surface is, from outside, brought into contact with the optical device holding member 82 only when the member is secured. However, the former method cannot be employed in practical and the latter method has a problem in that the mechanism is too complicated and the surface, which is brought into contact with the optical device holding member 82, is moved and, therefore, the member cannot stably be brought into contact with the optical device holding member 82 with a required accuracy.

SUMMARY OF THE INVENTION

In view of the foregoing, an object of the present invention is to provide an optical-path switching apparatus for an optical microscope which is capable of inserting/removing each optical devices into/from corresponding switching positions on optical paths by one optical-path switching apparatus and the size of which can be reduced.

Another object of the present invention is to provide an optical-device switching apparatus for an optical microscope which is capable of inserting/removing each optical devices into/from corresponding switching positions on optical paths by one optical-device switching apparatus and the size of which can be reduced.

Another object of the present invention is to provide an optical-path switching apparatus for an optical microscope which is capable of accurately switching optical-path without a complicated adjustment.

Another object of the present invention is to provide an optical-device switching apparatus for an optical microscope which is capable of accurately inserting/removing each optical devices into/from corresponding switching positions on optical paths without a complicated adjustment.

A still another object of the present invention is to provide a transportation locking apparatus for an optical microscope capable of easily and quickly securing optical devices while maintaining dust-proofing characteristic in the apparatus and the optical accuracy of each optical device.

According to a first aspect of the present invention, there is provided an optical-path switching apparatus for an optical microscope comprising:

a plurality of optical devices, each of the a plurality of optical devices is to be inserted into and removed from one of at least two or more switching positions provided for optical paths, so as to switch the optical paths;

drive force generating means for generating drive force;

insertion/removal means for transmitting the drive force generated by the drive force generating means so as to insert and remove the plural optical devices into and from the switching positions while relating the plural optical devices to one another; and control means for controlling switching of the optical devices to be performed by the insertion/removal means in order to obtain a required optical path.

According to the first aspect of the present invention, the insertion/removal means is controlled by the control means so that the drive force generated by the drive force generating means is transmitted by the insertion/removal means, so that the plural optical devices are inserted into or removed from the switching positions while relating the optical devices to one another. Therefore, the necessity of providing an insertion/removal means for each of the different switching positions can be eliminated. As a result, a compact optical-path switching apparatus and a compact optical-device switching apparatus for an optical microscope can be provided.

According to a second aspect of the present invention, there is provided an optical-device switching apparatus for an optical microscope according to claim 5, further comprising:

a plurality of guide members secured to positions in the optical microscope and at least one of which has a V-shape fixing groove for introducing and fixing the optical device; and a plurality of holding members supported by corresponding guide members among the plural guide members to hold corresponding optical devices among the plural optical devices, wherein each of the holding members corresponding to the guide members having the fixing grooves has at least one of fixing portions so as to be fixed to corresponding fixing position, the insertion/removal means has transmission means having a cam groove in a portion thereof and arranged to transmit the drive force generated by the drive force generating means, and a plurality of levers each having an end received in the cam groove of the transmission means and another end fixed to the corresponding holding member with a predetermined movable space, arranged to transmit the drive force transmitted from the transmission means so as to move the corresponding holding member on the corresponding guide member, detection means for detecting that at least one of the fixing portions has been moved to corresponding inclined portion of the fixing groove is further provided, and the control means further comprising interruption means for interrupting generation of the drive force from the drive force generating means after a predetermined period of time has passed from detection of the fixing portion being moved to the inclined portion of the fixing groove by the detection means so as to position the fixing portion in the fixing groove.

According to the second aspect of the present invention, the interruption means provided for the control means interrupts generation of the drive force from the drive force generating means after a predetermined period of time has passed from detection of the fixing portion being moved to the inclined portion of the fixing groove by the detection means. As a result, since the levers and the optical device holding members are fixed with a predetermined movable space, the fixing portion can accurately be positioned in the fixing groove. Thus, the optical devices can accurately be switched without necessity of a complicated adjustment.

According to a third aspect of the present invention, there is provided an optical device locking apparatus for an optical microscope for securing optical devices held in movable holding members, the optical device locking apparatus wherein:

a casing of the optical microscope is formed a screw hole in a portion thereof, the optical device locking apparatus comprising a securing member, formed a screw groove in a portion thereof, to be screwed in the screw hole from outside so that the securing member is inserted into the holding member at predetermined space so as to secure movement of the optical device in the moving direction.

According to the third aspect of the present invention, the securing member is screwed in the screw hole formed in the casing for the microscope and the securing member is movably inserted into the device holding member holding the optical device so that movement of the optical device in the moving direction is restricted.

As a result, a transportation locking apparatus can be provided which is capable of easily and quickly securing optical devices and the structure of which can be simplified while maintaining the dust-proofing characteristic in the apparatus and the optical accuracy of the optical devices.

According to a fourth aspect of the present invention, there is provided an optical device locking apparatus for an optical microscope for securing optical devices held in movable holding members, the optical device locking apparatus wherein:

a casing of the optical microscope is formed a through hole and at least one screw holes;

the optical device locking apparatus comprising:

a securing member having at least one through holes formed in a portion thereof and inserted through the through hole of the casing from outside and fixed by the holding member so as to prevent movement of the optical device in a moving direction; and at least one screws, each screws to be inserted into the a corresponding through hole of the securing member and screwed in the a corresponding screw hole formed in the casing, so as to secure the securing member to the casing of the optical microscope.

According to the fourth aspect of the present invention, the securing member is, through the through hole formed in the casing of the microscope, fixed to the holding member holding the optical device and the screw is, through the though hole formed in the securing member, threaded in the screw hole formed in the casing.

As a result, a transportation locking apparatus can be provided which is capable of easily and quickly securing optical devices and the structure of which can be simplified while maintaining the dust-proofing characteristic in the apparatus and the optical accuracy of the optical devices.

According to a fifth aspect of the present invention, there is provided an optical device locking apparatus for an optical microscope for securing optical devices held in movable holding members, the optical device locking apparatus wherein, a casing of the optical microscope is formed a screw hole formed in a portion thereof, the optical device locking locking apparatus comprising a securing member having a thread groove formed in a portion thereof and an insertion portion formed in an end portion thereof for receiving a portion of the holding member for holding the optical device and screwed in the screw hole from outside to receive a portion of the holding member in the insertion portion thereof so that movement of the optical device in a moving direction is prevented.

According to the fifth aspect of the present invention, the securing members is, from outside, received in the screw hole formed in the casing of the optical microscope and a portion of the holding member is received by the insertion hole so that movement of the optical device is prevented.

As a result, a transportation locking apparatus can be provided which is capable of easily and quickly securing optical devices and the structure of which can be simplified while maintaining the dust-proofing characteristic in the apparatus and the optical accuracy of the optical devices.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 9 is a diagram showing an optical-path switching apparatus for the optical microscope according to the first embodiment;

FIG. 11 shows the relationship among the optical paths and optical devices;

FIG. 12A is a diagram for illustrating the operation of a cam and lever mechanism;

FIG. 12B is a diagram for illustrating the operation of the cam and lever mechanism;

FIG. 12C is a diagram for illustrating the operation of the cam and lever mechanism;

FIG. 13 shows the relationship among the optical paths and optical devices;

FIG. 20 is a cross sectional view showing the structure of a transportation locking mechanism for the optical-path switching apparatus for an optical microscope according to a sixth embodiment of the present invention;

FIG. 21 is a side view showing the transportation locking mechanism for the optical-path switching apparatus for an optical microscope according to the sixth embodiment of the present invention;

FIG. 22A is a side view showing a transportation locking apparatus for a magnifying power changing apparatus for an optical microscope according to a seventh embodiment of the present invention;

FIG. 22B is a front view showing the transportation locking apparatus for the magnifying power changing apparatus according to the seventh embodiment of the present invention;

FIG. 22C is a bottom view showing the transportation locking apparatus for the magnifying power changing apparatus according to the seventh embodiment of the present invention;

FIG. 23 is a schematic view showing the structure of the transportation locking apparatus for an optical microscope according to an eighth embodiment of the present invention; and FIG. 24 is an enlarged view of a locking mechanism of the transportation locking apparatus for an optical microscope according to the eighth embodiment of the present invention.

DETAILED DESCRIPTION OF THE PREFERRED EMBODIMENTS

Figure 1:
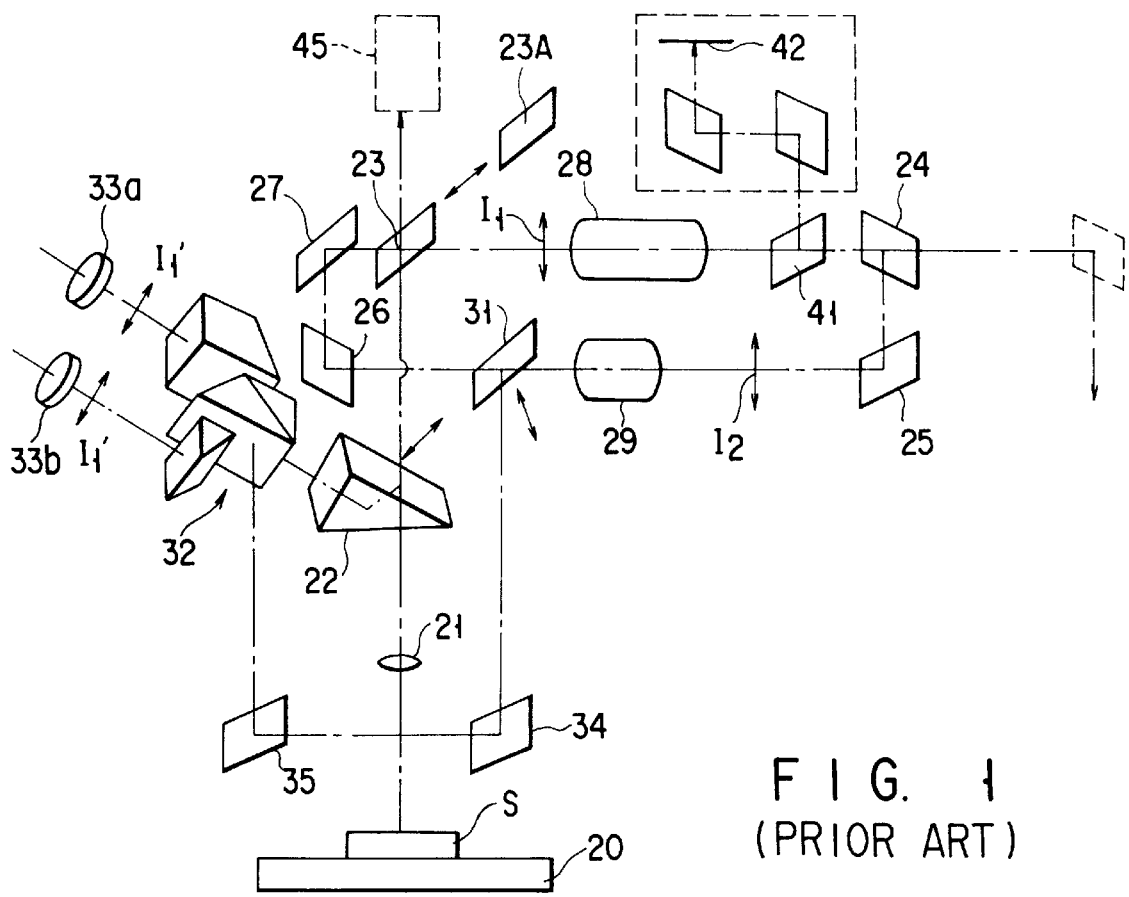
FIG. 1 is a diagram showing an optical system of an optical microscope.
Figure 2:
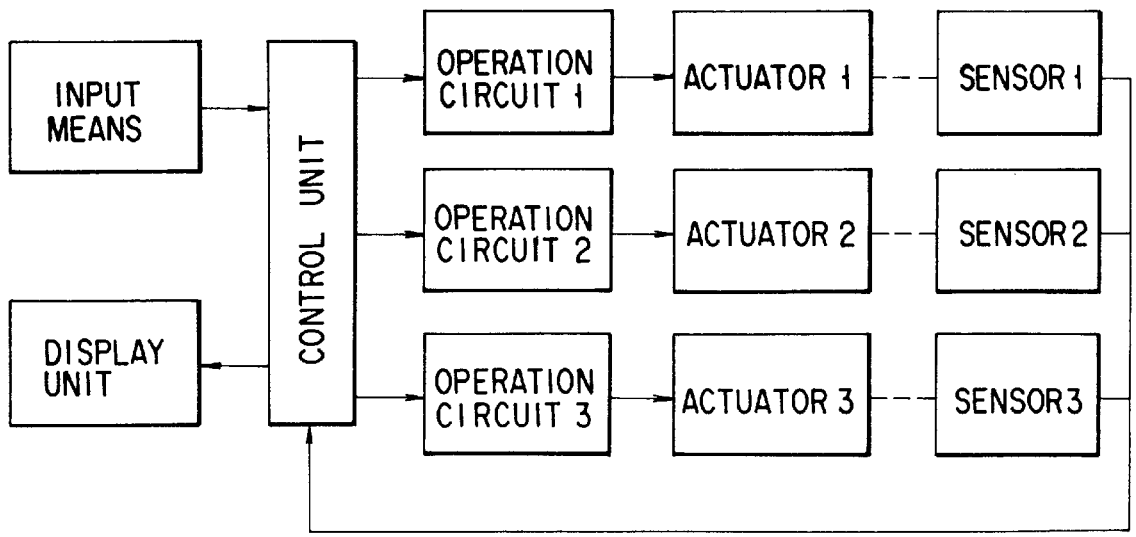
FIG. 2 is a control block diagram for a conventional optical-path switching apparatus for an optical microscope.
Figure 3:
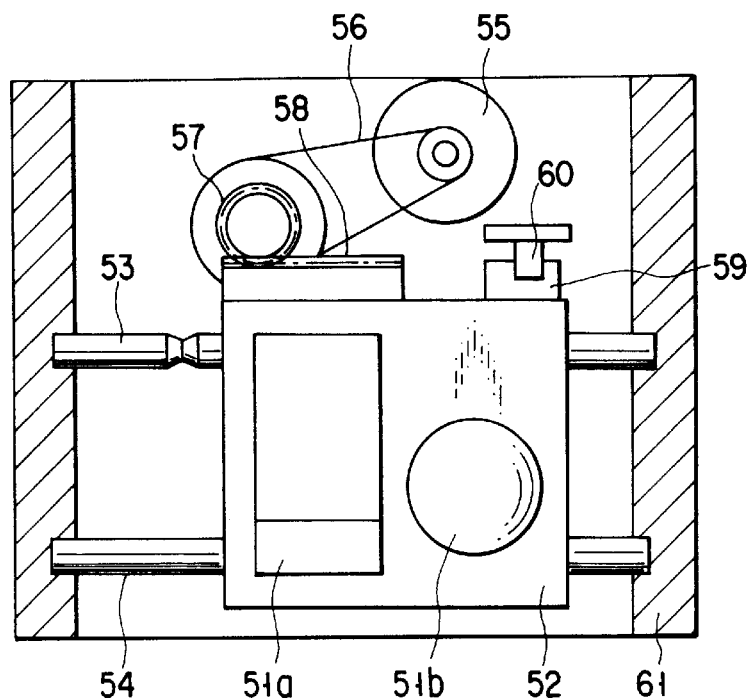
FIG. 3 is a cross sectional view of the conventional optical-path switching apparatus for an optical microscope.
Figure 4:
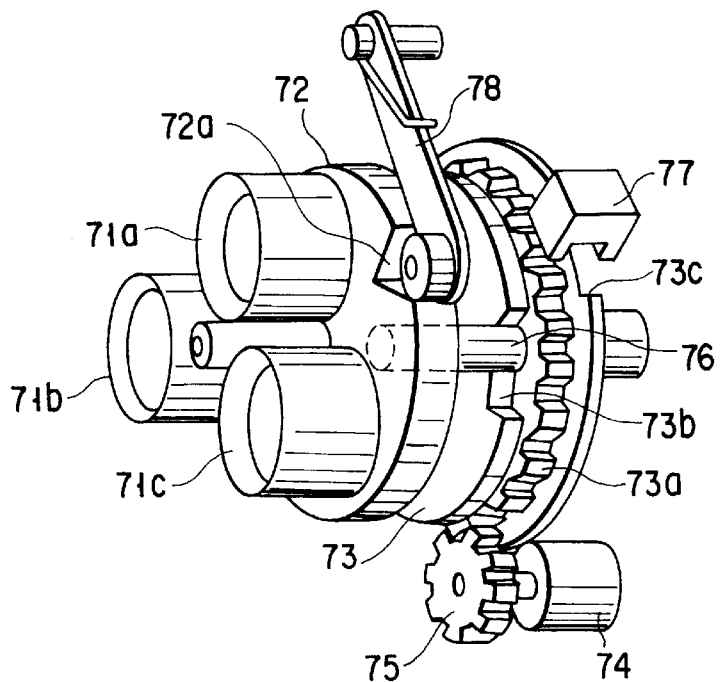
FIG. 4 is a perspective view of the conventional optical-path switching apparatus for an optical microscope.
Figure 5:
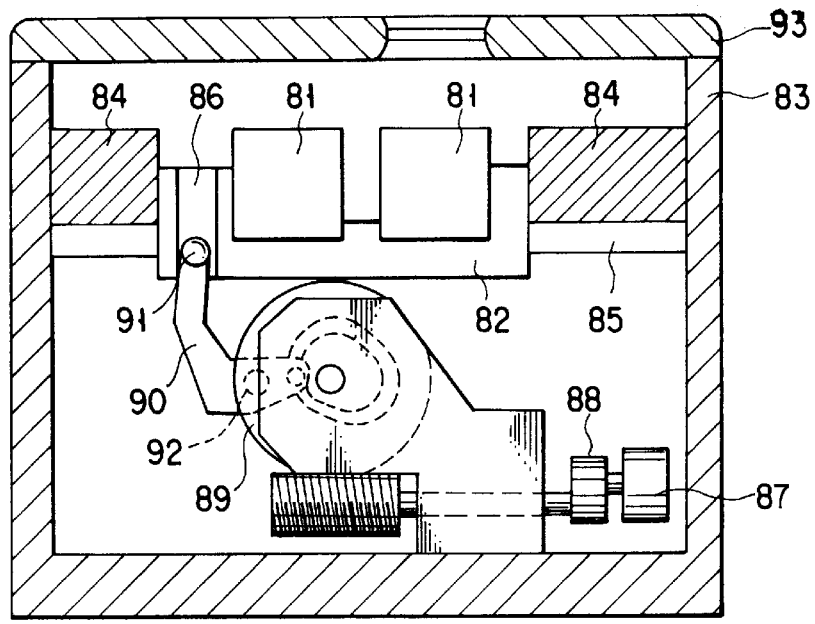
FIG. 5 is a cross sectional view of an optical-path switching apparatus into which elastic members for securing the optical device holding member have been inserted.
Figure 6:
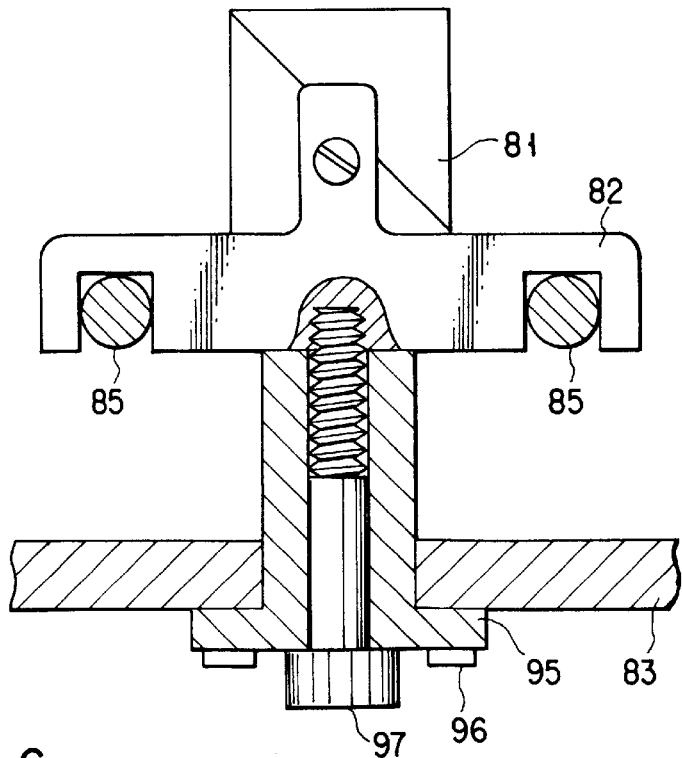
FIG. 6 is a cross sectional view showing a conventional transportation locking apparatus for the optical-path switching apparatus for an optical microscope.

Referring to the drawings, embodiments of the present invention will now be described.

First Embodiment

Figure 7:
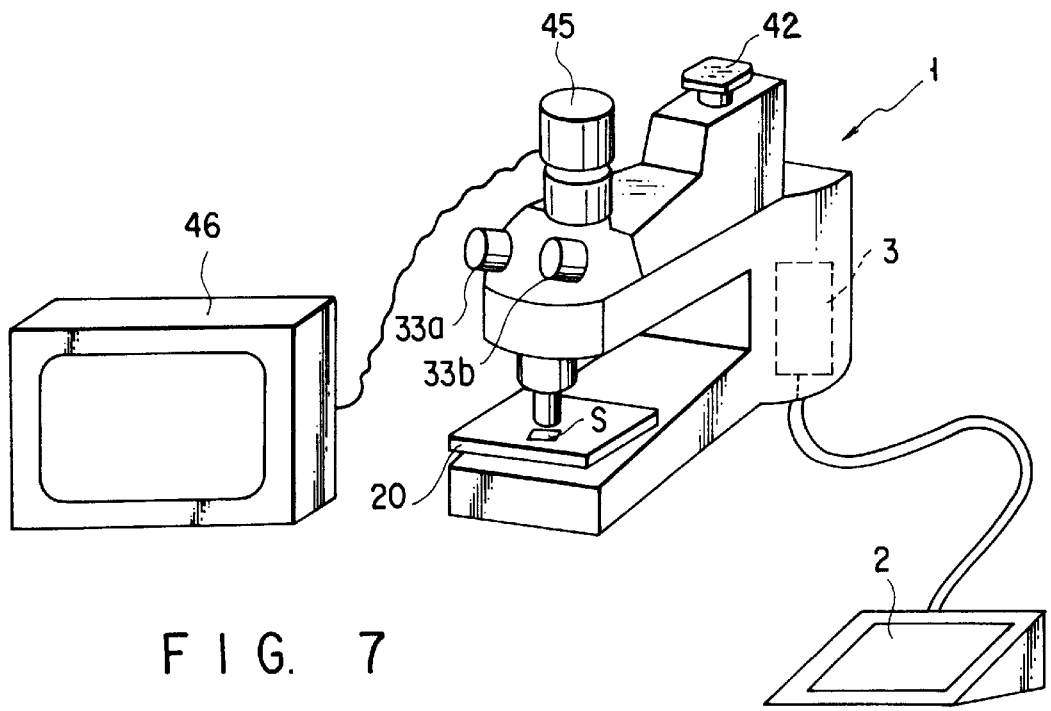
FIG. 7 is a perspective view showing the external structure of an optical microscope according to a first embodiment of the present invention.

FIG. 7 is a perspective view showing the shape of an optical microscope according to a first embodiment of the present invention.

As shown in FIG. 7, an optical microscope 1 has ocular lenses 33a and 33b for, with the naked eye, observing a specimen S placed on a stage 20, a TV camera 45 for displaying the specimen S on a TV monitor 46 and a photographing camera 42 for photographing the specimen S.

The optical microscope 1, in the body thereof, includes a control unit 3 for controlling the operation of switching each optical paths of an optical system in the optical microscope 1 in accordance with an instruction to switch the optical path supplied from a control panel 2. The control unit 3 controls the total operation of the optical microscope 1, such as control of movement of the stage 20, as well as the control of the operation for switching the optical devices.

Figure 8:
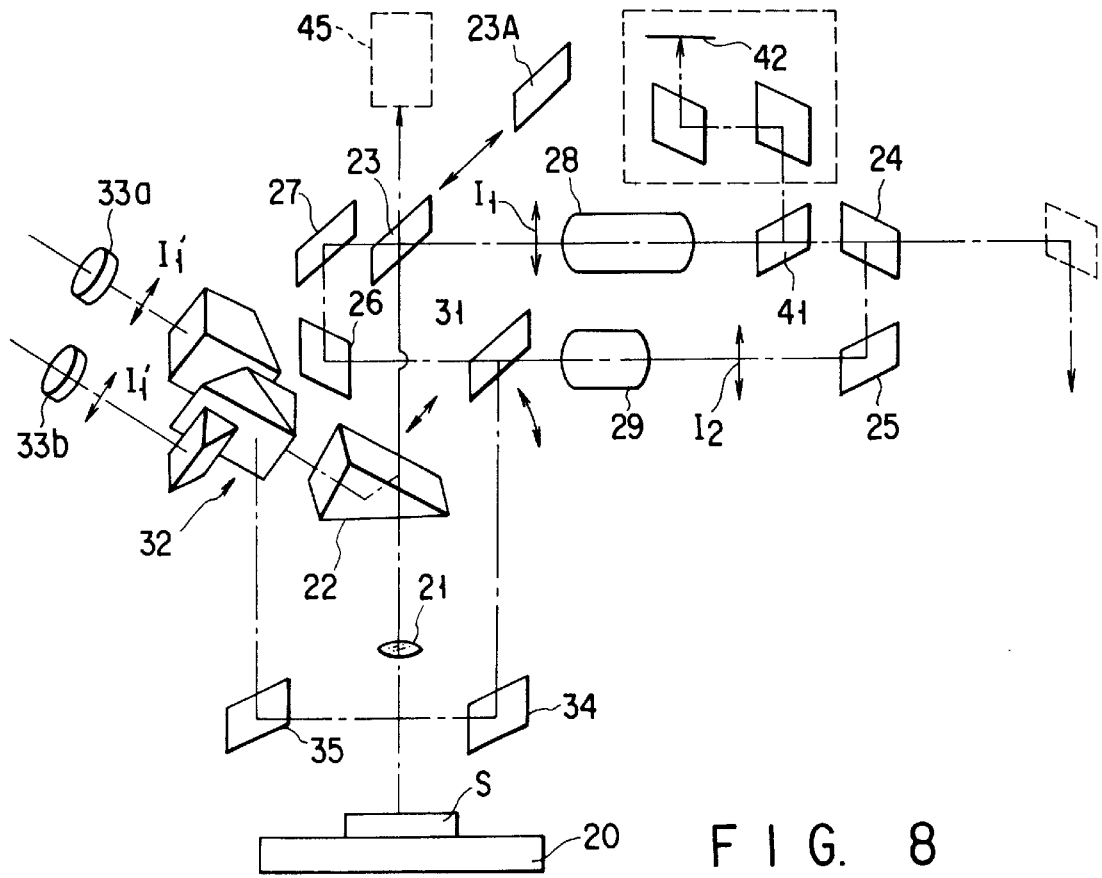
FIG. 8 is a diagram showing an optical system of the optical microscope according to the first embodiment.

FIG. 8 is a diagram showing the optical system of an optical microscope having the foregoing structure. Elements which are the same as those shown in FIG. 1 are given the same reference numerals.

The optical system shown in FIG. 8 has a deflection prism 22 for directly introducing, to ocular lenses 33a and 33b, a light beam reflected by the specimen S placed on the stage 20 and allowed to pass through the objective lens 21; a plurality of reflecting members 23 to 27 disposed to receive light beams from the objective lens 21 so as to form a loop optical path when the deflection prism 22 is placed on the outside of the optical path; relay lenses 28 and 29 disposed in the loop optical path; and a reflecting member or a beam splitter 31 which are allowed inserting into a position more rearwards than secondary image-formation position $I_2$ in the loop optical path.

Moreover, the foregoing optical system has a reflecting member 41 for directing the light beam from a position more rearwards than the first image-formation position $I_1$ in the loop optical path to a photographing optical path; reflecting surfaces 34 and 35 for introducing light beams branched by the reflecting member or the beam splitter 31 to the ocular lenses 33a and 33b through a prism 32; a photographing camera 42 disposed on the photographing optical path; and a TV camera 45 disposed on an injection optical path from the loop optical path. Note that light allowed to pass through the reflecting member 24 is used in photometry and so forth.

The bending prism 23 among the plural reflecting members 23 to 27, which is a reflecting member for forming a first reflecting surface, and a correction prism 23A for introducing the light beam in the loop optical path into the TV camera 45 are switched to be selectively inserted into the loop optical path.

The deflection prism 22, bending prism 23 and the correction prism 23A disposed at the switching positions are, by an optical-path switching apparatus, switched to be inserted or removed to and from the loop optical path.

FIG. 9 is a diagram showing the structure of the foregoing apparatus for switching the optical path. The switching apparatus is arranged to insert/remove the three optical devices into/from a corresponding position of the two switching positions in the optical system shown in FIG. 8, that is, the deflection prism 22, bending prism 23 and the correction prism 23A are switched by the switching apparatus.

FIG. 9 illustrates a state where the reflection prism 22 has been removed from an observation optical path 104 and the bending prism 23 has been inserted into the observation optical path 104.

Figure 10:
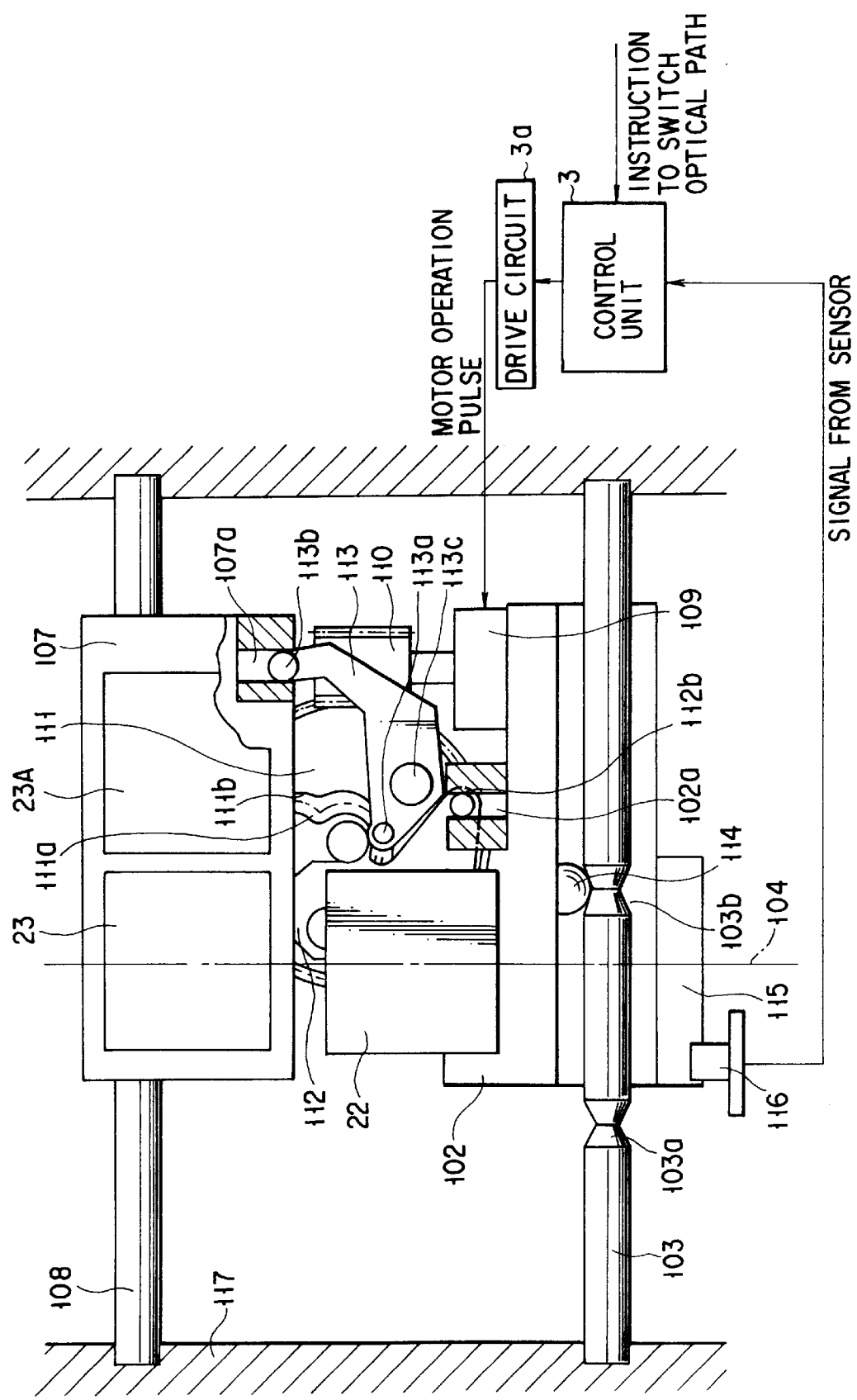
FIG. 10 is a diagram showing the optical-path switching apparatus for the optical microscope according to the first embodiment.

FIG. 10 is a diagram showing the apparatus for switching the optical path for an optical microscope in a state where the deflection prism 22 and the bending prism 23 have been inserted into the optical path 104.

Referring to FIGS. 9 and 10, reference numeral 102 represents a holding member for holding the deflection prism 22. Reference numeral 103 represents a guide rod for holding the holding member 102 in such a manner that the deflection prism 22 can arbitrarily be inserted or removed to and from the observation optical path 104.

Reference numeral 23 represents a bending prism, 23A represents a correction prism for correcting the length of the optical path and 107 represents a holding member for holding the bending prism 23 and the correction prism 23A. Reference numeral 108 represents a guide rod for supporting the holding member 107 in order to selectively insert or remove the bending prism 23 and the correction prism 23A to and from the observation optical path 104.

Reference numeral 109 represents a pulse motor and 110 represents a worm gear attached to a shaft of the pulse motor 109. Reference numeral 111 represents a worm wheel engaged to the worm gear 110 and having cam grooves 111a and 111b on the side surface thereof. Reference numeral 112 represents a first lever having an end 112a received in a cam groove 111a formed on the worm wheel 111, the first lever 112 being arranged to rotate relative to a supporting point 112c to cause another end 112b to urge the holding member 102 through a groove 102a formed in the holding member 102. Reference numeral 113 represents a second lever having an end 113a received in a cam groove 111b formed on the worm wheel 111, the second lever 113 being arranged to rotate relative to a supporting point 113c to cause another end 113b to urge the holding member 107 through a groove 107a formed in the holding member 107.

The cam grooves 111a and 111b on the worm wheel 111 actually form one orbit and partially share a range to be fixed to the ends 112a and 113a of the first and second levers 112 and 113.

Reference numeral 114 represents a fixing member secured to the holding member 102 and arranged to fix the deflection prism 22 to a predetermined position when the deflection prism 22 is inserted into or removed from the optical path 104. Reference numeral 115 represents a slit plate secured to the holding member 102. Reference numeral 116 represents a sensor disposed to correspond to the slit plate in order to detect that the holding member 102 has been fixed to a predetermined position.

A control unit 3 is connected to the sensor 116, the control unit 3 outputs control signal for generating a motor operating pulse based on a sensor signal supplied from the sensor 116 and instruction signal supplied from the control panel 2.

A drive circuit 3a which is connected to the control unit 3, outputs a motor operating pulse to a pulse motor 109 based on a control signal supplied from control unit 3.

Reference numeral 117 represents a lens tube body to which the guide rods 103 and 108, the motor 109, the worm wheel 111, the first lever 112 and the second lever 113 are secured.

The operation of the apparatus for switching the optical path for an optical microscope according to this embodiment will now be described.

The apparatus for switching the optical path for an optical microscope according to this embodiment enables three different optical paths to be obtained. As shown in FIG. 11, optical paths 1, 2 and 3 can be obtained by changing the state of insertion and removal of the deflection prism 22, the bending prism 23 and the correction prism 23A to and from the observation optical path 104.

The optical path 1 is, as shown in FIG. 10, an optical path formed when the deflection prism 22 and the bending prism 23 have been inserted into the optical path 104.

Therefore, all of light beams from the objective lens 21 are, by the deflection prism 22, directed to the ocular lenses 33a and 33b.

In the case where the optical path 1 has been formed, the bending prism 23 shown in FIG. 10 may be disposed in the optical path 104 or removed from the same because all of light beams are directed to the ocular lenses 33a and 33b by the deflection prism 22.

The optical path 2 is, as shown in FIG. 9, formed in a state where the deflection prism 22 has been removed from the optical path 104 and the bending prism 23 has been inserted into the optical path 104.

The following state corresponds to the optical path 2: a state where the deflection prism 22 has been removed from the optical path and the bending prism 23 has been inserted into the optical path in the structure shown in FIG. 8 so that a loop optical path has been formed.

Therefore, light from the objective lens 21 is bent substantially perpendicularly by the bending prism 23, and then allowed to pass through the loop optical path, and then returned to the bending prism 23 so as to be bent substantially perpendicularly and introduced into the TV camera. As an alternative to this, light is directed to the ocular lenses 33a and 33b at an intermediate position of the loop optical path by the reflecting member or the beam splitter 31 shown in FIG. 8.

The optical path 3 is formed when the deflection prism 22 has been removed from the optical path 104 and the correction prism 23A has been inserted into the optical path 104. The foregoing state corresponds to a state where the following elements shown in FIG. 8 are moved as follows: the deflection prism 22 has been removed from the optical path, the bending prism 23 has been removed from the bending prism 23 and the correction prism 23A has been inserted into the optical path so that light from the objective lens 21 is as it is introduced into the TV optical path through the correction prism 23A.

A cam and lever mechanism for forming the optical paths 1 to 3 will now be described with reference to FIGS. 12A to 12C.

When a worm wheel 111 has been rotated clockwise from an angle of rotation corresponding to the optical path 1 as shown in FIG. 12A, the end 112a of the first lever 112 is applied with force from a wall 111a of the cam groove formed in the worm wheel 111 so that the first lever 112 starts clockwise rotating relative to the supporting point 112c.

When the worm wheel 111 has been rotated to a state of the optical path 2 as shown in FIG. 12B, the first lever 112 rotates by an angular degree required for the end 112b drives the deflection prism 22.

When the worm wheel 111 has been further clockwise rotated from a state of the optical path 2, the first lever 112 is not rotated because the end 112a moves on to a track formed by the cam groove of the worm wheel 111 and having a predetermined radius with respect to the center of rotation.

The second lever 113 is applied with the force from the wall surface 111a of the cam groove to start rotating around the supporting point 113c. When the worm wheel 111 has been rotated to the state of the optical path 3 as shown in FIG. 12C, the second lever 113 is rotated for an angular degree required for the end 113b to drive the bending prism 23 and the correction prism 23A.

The operation for switching the foregoing three optical paths will now be described shown in FIG. 10.

It is assumed that the optical path 1 is initially set.

When an instruction to switch the optical path has been issued from the control panel 2 to the control unit 3 in the state of the optical path 1, a control signal is supplied from the control unit 3 to the drive circuit 3a and then a motor drive pulse is supplied from the drive circuit to the pulse motor 109. As a result, the pulse motor 109 is rotated so that the worm wheel 111 is, through the worm gear 110, rotated clockwise as indicated by an arrow shown in FIG. 12A.

Rotation of the worm wheel 111 causes the first lever 112 having the end 112a received in the cam groove 111a formed on the side surface of the worm wheel 111 to be also rotated around the supporting point 112c.

Rotation of the first lever 112 is, at the end 112b thereof, converted into linear motion by the groove 102a formed in the holding member 102. Thus, the holding member 102 starts moving along the guide rod 103.

When the holding member 102 has been moved to a predetermined position, that is, a position at which the deflection prism 22 has been removed from the optical path 104, the slit plate 115 secured to the holding member 102 is ejected from a detection range for the sensor 116.

In response to a sensor signal supplied from the sensor 116 at this time, the control unit 3 detects that the deflection prism 22 has been moved to a predetermined position so that the control unit 3 supplies an interruption signal to the pulse motor 109.

Simultaneously, the fixing member 114 is received by the V-groove 103a formed in the guide rod 103 so that the holding member 102 and the deflection prism 22 held by the holding member 102 are stopped at the removal positions from the optical path 104. The foregoing state corresponds to the state of the optical path 2 shown in FIG. 9.

The detection to be performed by the control unit 3 that the slit plate 115 has been removed from the detection range for the sensor 116 is stored as a pulse of the pulse motor 109. Then, a predetermined number of pulses, the reference of which is the foregoing pulse, are supplied to the pulse motor 109 so that switching to all of the optical paths is performed.

A modification of the first embodiment may be employed in which another cam groove is formed in the reverse surface of the worm wheel 111 and the optical device holding member holding the beam splitter 31 shown in FIG. 8 is connected to a lever. Thus, also the beam splitter 31 can be moved by the pulse motor 109. In the foregoing case, an optical path as shown in FIG. 13 is formed.

As a result, the apparatus for switching the optical path for an optical microscope according to this embodiment is able to switch the two switching portions, that is, the switching portion of the deflection prism 22 and the switching portion of the bending prism 23 and the correction prism 23A by one motor and one sensor without the necessity of providing plural actuators and sensors. Therefore, the structure of the drive system can be simplified and the cost of the optical microscope can be reduced.

Although the foregoing embodiment has been described about the switching apparatus for switching the optical devices at two or three switching positions, the foregoing structure may, of course, be applied to a structure having four or more switching portions.

Second Embodiment

Figure 14:
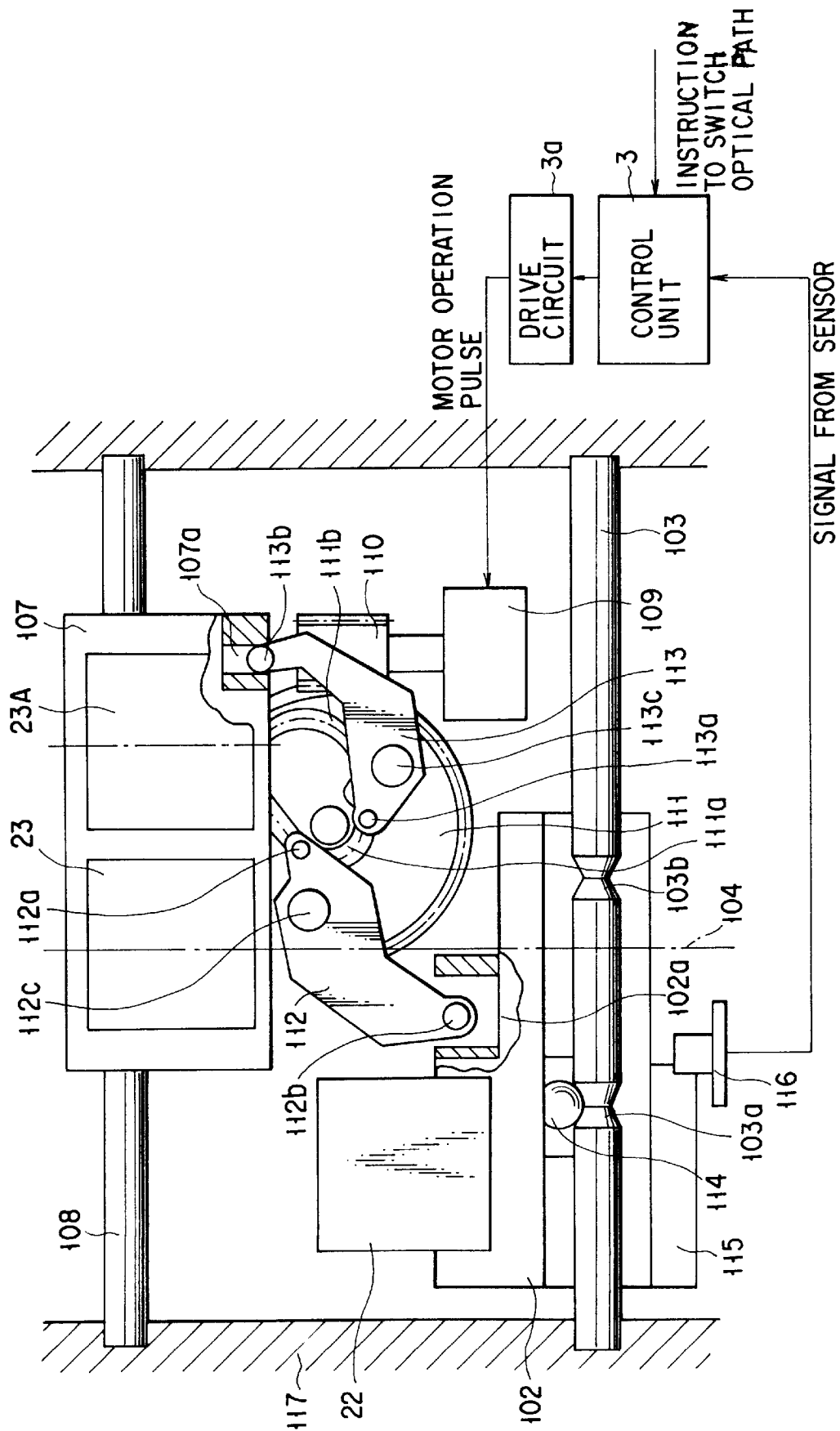
FIG. 14 is a diagram showing an optical-path switching apparatus for an optical microscope according to a second embodiment of the present invention.

FIG. 14 is a diagram of an apparatus for switching the optical path for an optical microscope according to a second embodiment of the present invention.

The apparatus for switching the optical path for an optical microscope according to this embodiment has characteristics that an end 112b of a first lever 112 and a groove portion of a holding member 102 are fixed with a predetermined movable amount.

Elements which are the same as those shown in FIG. 9 are given the same reference numerals.

Figure 15:
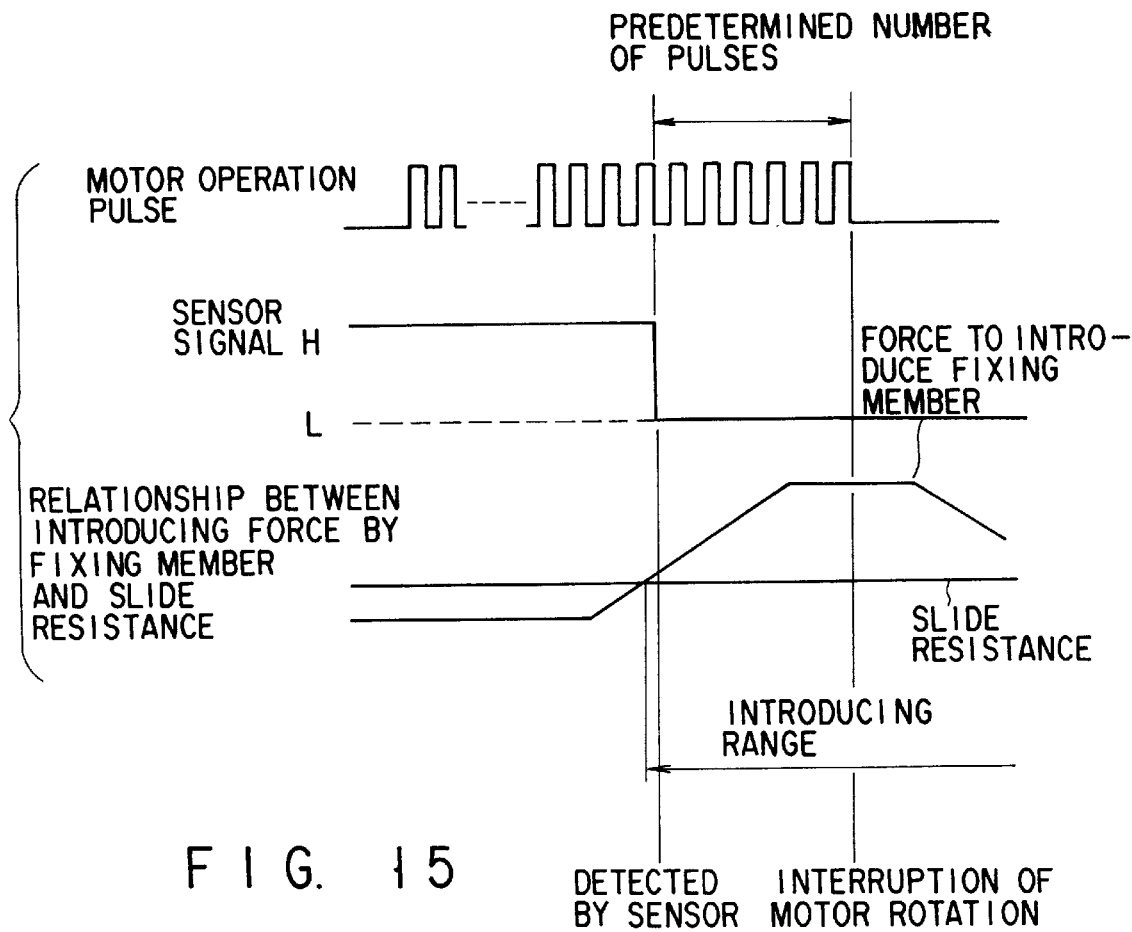
FIG. 15 is a timing chart for explaining the operation of the optical-path switching apparatus for an optical microscope according to the second embodiment of the present invention.

Referring to a timing chart shown in FIG. 15, the operation of the apparatus for switching the optical path according to this embodiment will now be described.

The apparatus for switching the optical path for an optical microscope according to this embodiment has a structure such that introduction of the fixing member 114 secured to the holding member 102 into the inclined portion of a predetermined position 103a formed in the guide rod 103 results in introduction of the fixing member 114 toward a predetermined position being commenced and simultaneously the slit plate 115 being ejected from the detection range for the sensor 116.

At this time, a signal level supplied from the sensor 116 becomes low level, thus causing introduction of the fixing member 114 into the inclined portion of the predetermined position 103a to be detected by the control unit 3.

Since the speed, at which the holding member 102 is introduced into the stoppage position due to the introducing force of the fixing member 114, is higher than the speed at which the holding member 102 is moved by the first lever 112, the holding member 102 is removed from the urging force of the first lever 112 and slightly earlier introduced into the stoppage position.

The pulse motor 109 continues rotating during this, and then stops when the pulse motor 109 has transmitted a predetermined number of pulses counted from detection performed by the sensor 116. That is, the control unit 103 interrupts transmission of the motor operation pulse to the pulse motor 109 after a predetermined period of time has passed from detection of introduction of the fixing member 114 into the inclined portion of the V-groove 103a by the sensor 116.

The position, at which the worm wheel 111 is stopped, is arranged to accurately correspond to a predetermined angle of rotation required to switch the deflection prism 22.

Therefore, the apparatus for switching the optical path for an optical microscope according to this embodiment has the structure such that the holding member 102 is introduced into the predetermined position 103a by the fixing member 114 earlier than stoppage of the pulse motor 109 by the period of time corresponding to a predetermined number of pulses. Therefore, the operation for switching the holding member 102 and the deflection prism 101 can be performed without any error occurring in the angle of rotation of the worm wheel 111 having the cam grooves 111a and 111b formed therein.

Although the description has been performed about the structure in which the first lever 112 and the holding member 102 are fixed to each other with a predetermined movable range, the foregoing structure may, of course, be applied to a case where the second lever 113 and the second holding member 107 are fixed to each other with a predetermined movable range.

Third Embodiment

An apparatus for switching the optical path for an optical microscope according to a third embodiment of the present invention will now be described.

The apparatus for switching the optical path for an optical microscope according to this embodiment is characterized in that two fixing mechanisms having different introducing ranges are employed. The residual structures are the same as those of the apparatus for switching the optical path for an optical microscope according to the second embodiment.

Figure 16:
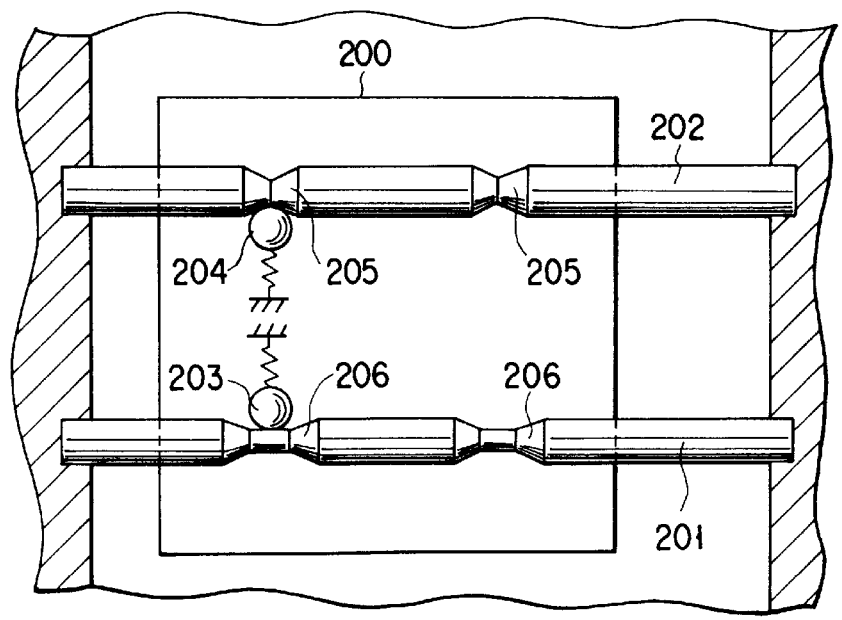
FIG. 16 is a top view showing a fixing mechanism of the optical-path switching apparatus for an optical microscope according to the second embodiment of the present invention.

FIG. 16 is a top view showing the structures of the fixing mechanisms of the apparatus for switching the optical path for an optical microscope according to this embodiment.

As shown in FIG. 16, the holding member 200 for holding the optical device is supported by two guide rods 201 and 202. Each of the guide rods 201 and 202 has grooves 205 and 206 having different introducing ranges.

Reference numerals 203 and 204 represent fixing members for fixing the holding member 200 to grooves 205 and 206 formed in each of the guide rods 201 and 202.

When the holding member 200 is moved, introducing force is initially generated by the groove 206 formed in the guide rod 201 and having a wide introducing range and the fixing member 203.

When the holding member 200 has further approached the stoppage position, the holding member 200 is introduced into the stoppage position by the groove 205 formed in the guide rod 202 and having a small introducing range and the fixing member 204.

Figure 17A:
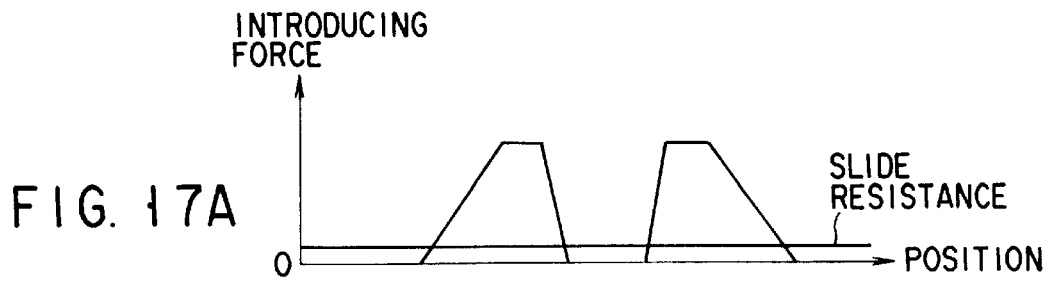
FIG. 17A shows the relationship between the introducing force of a groove having a wide introducing range formed in a guide rod and a securing portion.

FIG. 17A is a graph showing the relationship between the introducing force of the groove 206 formed in the guide rod 201 and having a wide introducing range and the position of the fixing member 204. As shown in FIG. 17A, the introducing force is zero when the fixing member 204 is positioned at the central position (the stoppage position) of the groove 206. In the inclined portion, a moderate introducing force is generated.

Figure 17B:
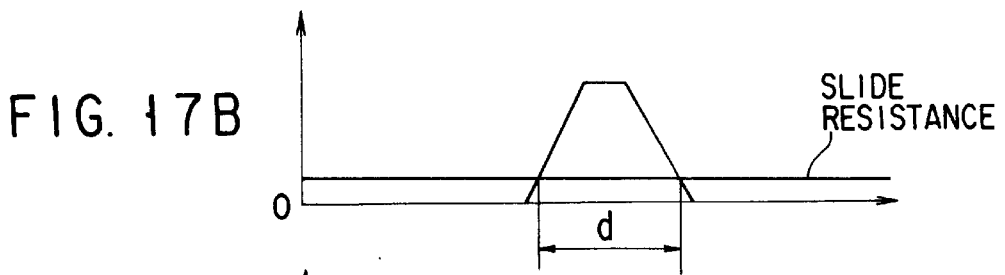
FIG. 17B shows the relationship between the introducing force of a groove having a small introducing range formed in a guide rod and a securing portion.

FIG. 17B is a graph showing the relationship between the introducing force of the groove 205 formed in the guide rod 202 and having a small introducing range and the position of the guide rod 202. As shown in FIG. 17B, the introducing force is made to be maximum when the fixing member 204 is positioned at the central position (the stoppage position) of the groove 206.

Figure 17C:
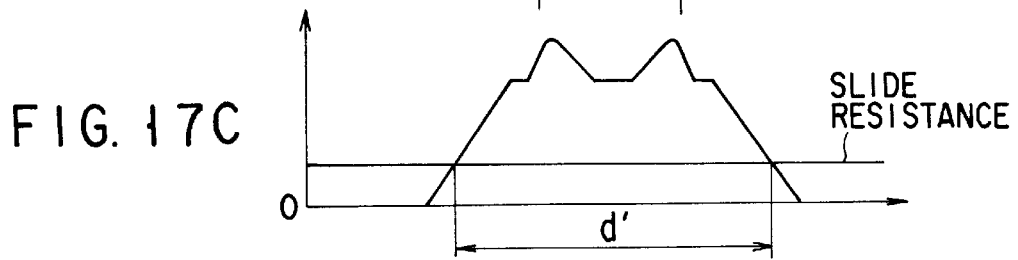
FIG. 17C shows results of composition of the introducing force shown in FIG. 17A and that shown in FIG. 17B.

FIG. 17C is a graph showing a result of composition of the introducing force shown in FIG. 17A and that shown in FIG. 17B.

As shown in FIG. 17C, the structure, in which the introducing ranges of the grooves formed in the two guide rods 201 and 202 for supporting the holding member are made to be different from each other, enables introducing range d' to be widened.

Therefore, the apparatus for switching the optical path for an optical microscope according to this embodiment enables the introducing range to be widened. Therefore, the optical paths can reliably be switched even if the manufacturing accuracy of each of the cam grooves 111a and 111b and the levers 112 and 113 are unsatisfactory.

Although the description has been performed about the structure such that the grooves having different introducing ranges are formed in the two guide rods 201 and 202 for supporting the holding member 200, three or more guide rods for supporting the optical device holding member 200 may be provided. As a matter of course, grooves having different introducing ranges may be formed in each of the guide rods in the foregoing case.

Fourth Embodiment

An apparatus for locking the apparatus for switching the optical path for an optical microscope according to a fourth embodiment will now be described.

The apparatus for switching the optical path for an optical microscope according to this embodiment is characterized in that a screw portion is formed in a portion of the lens tube body and a pin is screwed in the screw portion so as to lock the holding member.

Figure 18:
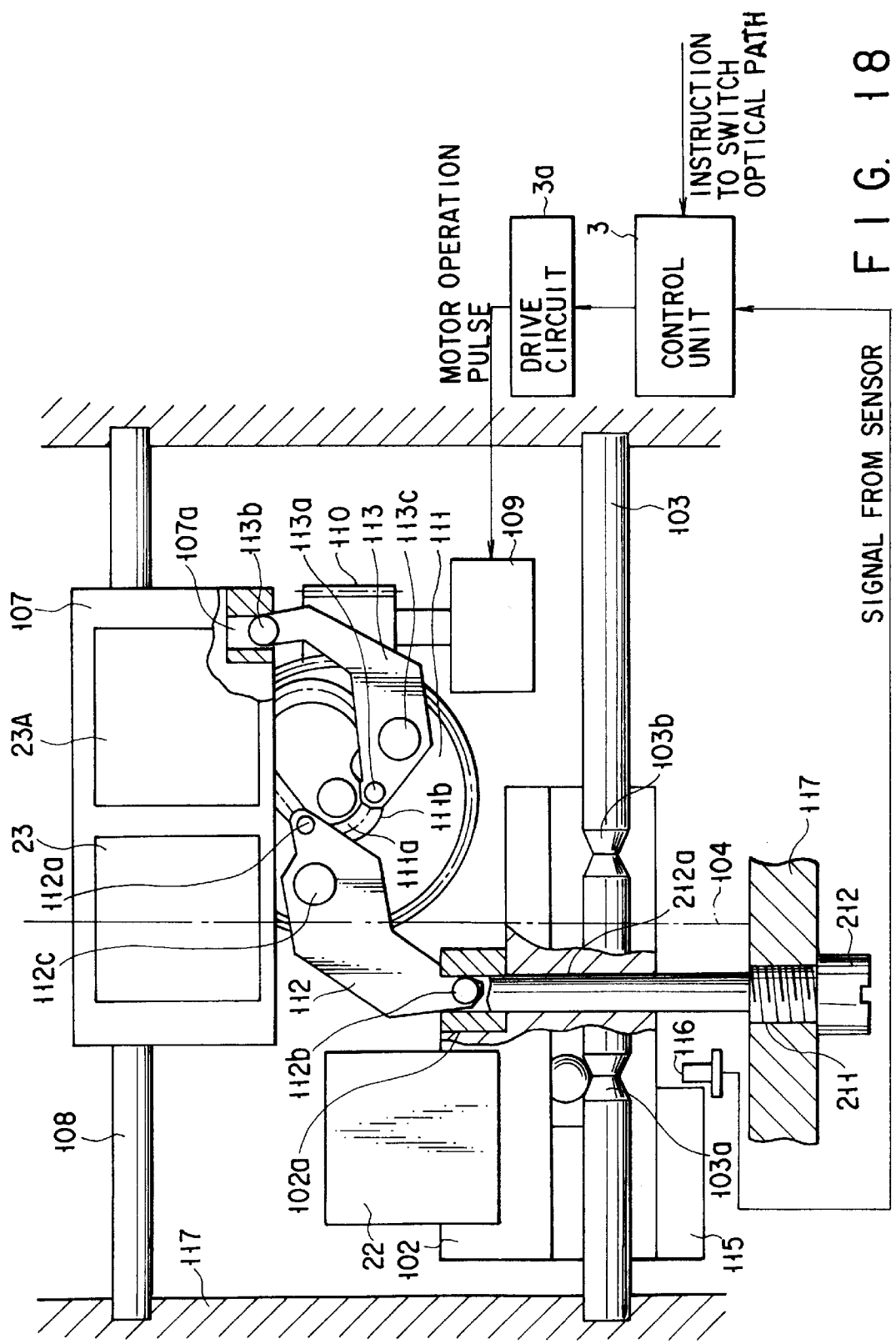
FIG. 18 is a diagram showing the structure of a transportation locking mechanism for the optical-path switching apparatus for an optical microscope according to a fourth embodiment of the present invention.

FIG. 18 is a diagram showing the structure of a transportation locking apparatus for the apparatus for switching the optical path for an optical microscope according to this embodiment. The same elements as those shown in FIG. 9 are given the same reference numerals and the same elements are omitted from description. The description will be performed about only different portions.

As shown in FIG. 18, the screw portion 211 is formed in a portion of the lens tube body 117. The pin 212 having a screw groove formed in a portion of the body thereof is screwed in the screw hole 211.

When the pin 212 has been completely screwed in the screw hole 211, a leading end 212a of the pin 212 is received by a groove 102a of the holding member 102. In this case, a slightly space exists between a leading end 212a of the pin 212 and a groove 102a of the holding member 102 so that holding member 102 is not influenced by the pin 212. When the pin 212 has been loosened, the state where the holding member 102 is secured is suspended.

The operation of the transportation locking apparatus for the apparatus for switching the optical path for an optical microscope having the foregoing structure and according to this embodiment will now be described.

The pin 212 is not used in a normal operation in which two switching portions are operated by the pulse motor 109. When an instruction to switch the optical path has been issued, the pulse motor 109 rotates so that the worm wheel 111 rotates clockwise, when viewed in FIG. 18, through the worm gear 110.

Rotation of the worm wheel 111 causes the first lever 112 having an end received in the cam groove 111a formed on the side surface of the worm wheel 111 to be also clockwise rotated around the supporting point 112c of the first lever 112.

Rotation of the first lever 112 is, at the end 112b thereof, converted into linear motion in the groove 102a formed in the holding member 102. Thus, the holding member 102 starts moving along the guide rod 103.

When the holding member 102 has been moved to a predetermined position, that is, a position at which the deflection prism 22 is removed from the optical path 104, the slit plate 115 secured to the holding member 102 is removed from the sensing range for the sensor 116. Thus, detection performed by the sensor 116 results in an instruction to interrupt rotation of the pulse motor 109 to be issued.

Simultaneously, the fixing member 114 is received by the V-groove 103a formed in the guide rod 103 so that the holding member 102 and the deflection prism 22 held by the holding member 102 are stopped at positions removed from the optical path 104.

When the pin 212 has been threaded, the movement of the holding member 102 in the moving direction is prevented by the pin 212 even if the pulse motor 109 is rotated and thus the first lever 112 has been moved. Therefore, the holding member 102 cannot be moved.

Therefore, according to the transportation locking apparatus for the apparatus for switching the optical path for an optical microscope according to this embodiment, the optical devices can easily and quickly be secured in such a manner that dust proof in the apparatus and the optical accuracy of each optical device is maintained.

Fifth Embodiment

A transportation locking apparatus for the apparatus for switching the optical path for an optical microscope according to a fifth embodiment of the present invention will now be described.

Figure 19:
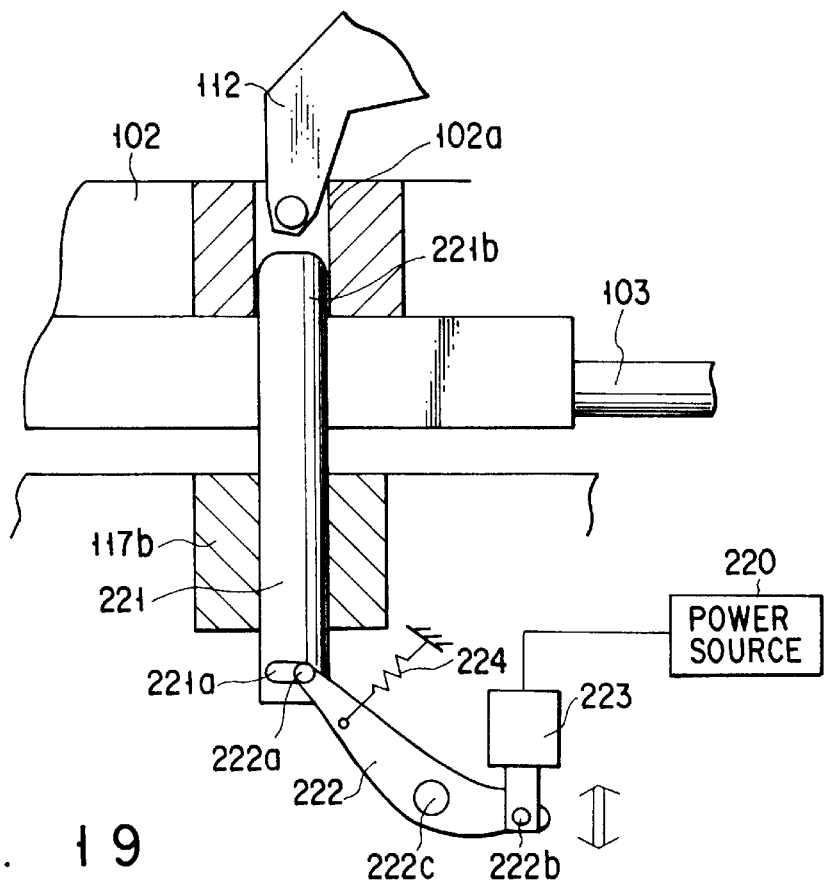
FIG. 19 is a diagram showing the structure of a transportation locking mechanism for the optical-path switching apparatus for an optical microscope according to a fifth embodiment of the present invention.

FIG. 19 is a diagram showing the structure of the transportation locking apparatus for the apparatus for switching the optical path for an optical microscope according to the fifth embodiment of the present invention. The same elements as those shown in FIG. 9 are given the same reference numerals and the same elements are omitted from illustration. The description will be performed about only different portions.

The transportation locking apparatus for the apparatus for switching the optical path for an optical microscope according to this embodiment is characterized in that a pin 221 is automatically and inserted by the holding member 102.

Referring to FIG. 19, reference numeral 117b represents a portion of the lens tube having a through hole, into which the pin 221 is inserted. A leading end 222a of the lever 222 is connected to an end 221a of the pin 221.

The lever 222 is able to rotate around a shaft 222c and has another end 222b connected to a shaft of a solenoid 223. Moreover, a spring 224 is attached to a position adjacent to the end 222a of the lever 222.

The solenoid 223 is connected to a power source 220 of the apparatus for switching the optical path so that electric power is supplied when the power source 220 of the apparatus for switching the optical path has been turned on.

The operation of the transportation locking apparatus for the apparatus for switching the optical path for an optical microscope according to this embodiment will now be described.

When the power source 220 of the apparatus for switching the optical path has been turned on, the solenoid 223 is supplied with electric power so that the lever 222 is rotated due to the attracting force of the solenoid 223.

As a result, the end 221b is removed from the groove 102a of the holding member 102 so that the state where the optical device holding member 102 is suspended. When the power source 220 has been turned off, the force of the spring 224 urges the pin 221 to be movably received in the groove 102a of the holding member 102. As a result, movement of the optical device holding member 102 is prevented.

Therefore, the transportation locking apparatus for the apparatus for switching the optical path for an optical microscope according to this embodiment has the structure such that switching of the optical devices is automatically locked when the power source is turned on or off. Thus, a complicated operation of locking the optical device when an optical microscope is transported can be omitted. Moreover, the mechanism can be protected from being damaged due to an impact taking place during transportation.

Although the description has been performed about the structure in which fixing of the optical device holding member is suspended when the power source 220 of the apparatus for switching the optical path has been turned on, the foregoing arrangement may, of course, be applied to a structure in which fixing is suspended when the power source of the optical microscope is turned on.

Sixth Embodiment

FIG. 20 is a cross sectional view showing a transportation locking apparatus for the apparatus for switching the optical path for an optical microscope according to a sixth embodiment of the present invention. FIG. 21 is a side view showing the transportation locking apparatus for the apparatus for switching the optical path for an optical microscope according to this embodiment.

Optical devices 231, which are prisms of two types, are secured to an optical device holding member 232. The optical device holding member 232 has a groove formed in the lengthwise direction of the apparatus. When the groove and a guide rod 233 are slid mutually, the optical device holding member 232 is moved to the right or left.

The optical device holding member 232 has a groove 234 formed in a direction perpendicular to the lengthwise direction of the apparatus. The groove 234 is arranged to receive an arm 236 to which a bearing 235 is attached.

The width of the groove 234 is made to be slightly larger than the diameter of the bearing 235 to permit a play so that the bearing 235 is always brought into contact with one surface of the groove when the moving direction is changed.

The arm 236 is rotated around a supporting point 237 when the bearing adjacent to the cam 238 traces a cam groove formed in the cam 238.

At this time, the optical device holding member 232 is pushed by the bearing 235 and moved. If the overall body of the apparatus is vibrated during transportation or the like, the optical device holding member 232 is moved to the right and left so that the bearing 235 is applied with a load in an opposite direction of the movement of the optical device holding member 232.

Although it leads to a fact that the bearing 235 is sometimes broken, the bearing 235 adjacent to the cam 238 is more easily broken due to the principle of leverage. Accordingly, a screw hole 241a is formed in a cover 240, which is fixed on a casing 239; and a fixing screw 241 having a screw portion in a portion of the body thereof is screwed in the screw hole 241a.

The leading end of the fixing screw 241 is rounded and the diameter of the leading end of the same is made to be slightly smaller than the width of the groove 234.

When the fixing screw 241 is screwed in to an extent that the knob portion 242 is brought into contact with the top surface of the cover 240, the leading end of the fixing screw 241 is received by the groove 234 of the optical device holding member 232. In this case, a slightly space exists between the leading end of the fixing screw 241 and the groove 234 of the optical device holding member 232. As a result, the movement of the optical device holding member 232 in the moving direction is prevented.

In a case where an intended structure of the apparatus requires the fixing screw 241 for limiting the movement of the optical device holding member 232 to be disposed at another position, the groove for receiving the fixing screw 241 may be formed individually from the groove for transmitting the driving force. Although a cost for forming the groove is required in the foregoing case, an advantage can be realized in which the position and size of the fixing screw can arbitrarily be changed.

Therefore, the transportation locking apparatus for the apparatus for switching the optical path for an optical microscope according to this embodiment is able to prevent loads being applied to the bearing 235 during transportation. Thus, breakage of the apparatus for switching the optical path can be prevented.

Moreover, the foregoing mechanism can easily be realized by simply forming the screw hole 241a in the cover 240 and by manufacturing the fixing screw 241. Since only the diameter of the leading end of the fixing screw 241 is required to meet a predetermined accuracy, the cost can significantly be reduced.

Since the screw hole formed in the fixing member 204 is covered with the fixing screw 241, satisfactory dust proofing characteristic can be realized and detachment can easily be performed.

Seventh Embodiment

FIG. 22A is a front side showing the structure of a transportation locking apparatus for a magnifying power changing apparatus of an optical microscope according to a seventh embodiment of the present invention. The magnifying power changing apparatus for an optical microscope shown in FIG. 22A comprises a lens of a zoom optical system for moving the lens.

FIG. 22B is a front view showing the transportation locking apparatus for the magnifying power changing apparatus according to this embodiment. FIG. 22C is a bottom view taken along an arrow shown in FIG. 22B and showing the transportation locking apparatus for the magnifying power changing apparatus according to this embodiment.

Reference numeral 241a represents a lens of a zoom optical system. The lens 241a is secured to a lens frame 242. The lens frame 242 has two openings into which a guide rod 243 is received. The lens frame 242 slides and moves along the guide rod 243.

Moreover, a shaft 246 for holding a bearing 245 which rolls along a cam groove of the rod cam 244 is fastened to the lens frame 242. Thus, when the rod cam 244 has been rotated, the rotational force is transmitted through the bearing 245 and the shaft 246 so that the lens frame 242 is moved.

To lock the optical device during transportation, an L-shape restricting member 248 is inserted into a rectangular through hole 247a previously formed in the bottom surface of a casing 247. Then, a U-shape groove formed at the leading end of the restricting member 248 is fitted to the outer shape of the shaft 246. Then, the restricting member 248 is secured from outside by a screw 248a.

That is, the shaft 246 of the lens frame 242 forming a portion of the optical device holding member is fixed by the restricting member 248 so that the movement of the lens frame 242 in the moving direction is prevented.

Note that the sixth and seventh embodiments have the structure such that the bearing is required to be stopped at the center of the groove in such a manner that the contact of the groove wall with the bearing is prevented.

Since the transportation locking apparatus for the magnifying power changing apparatus for an optical microscope according to this embodiment has the structure such that insertion of the restricting member 248 from outside causes the shaft 246 of the lens frame 242 to be fixed so as to prevent movement in the moving direction, the optical device can easily be locked to prevent movement.

Eighth Embodiment

FIG. 23 is a schematic view showing a transportation locking apparatus for an optical microscope according to an eighth embodiment of the present invention. FIG. 24 is an enlarged view showing a transportation locking mechanism of the transportation locking apparatus for an optical microscope according to this embodiment.

FIGS. 23 and 24 show a magnifying power changing mechanism for a zoom optical system having a cylindrical cam.

As shown in FIGS. 23 and 24, when a cylindrical cam 251 having a gear at an end thereof has been rotated by a motor gear 252, a bearing 253 rolls along a curved surface on the upper portion of the cylindrical cam 251.

The bearing 253 is connected to a lens frame 255 through a shaft 254. The lens frame 255, to which lens 255a is secured, is vertically moved along a guide rod 256.

Since the lens frame 255 is always pulled downwards by a tension spring (not shown), the bearing 253 is not separated from the curved cam surface. However, force larger than the spring force applied in an opposite direction during transportation or the like sometimes breaks the bearing or the surface of the cam.

Accordingly, a fixing screw 258 having a screwed groove in a portion of the body thereof is threaded in a screw hole formed in a casing 257 to insert the bearing 253 into a receiving hole 261 formed to receive the bearing 253 formed at the leading end of the fixing screw 258.

After the fixing screw 258 has completely be screwed in the screw hole, movement of the lens frame 255 in the moving direction is locked.

When the screw hole, to be formed in the casing 257, is formed slightly upper than the center of the bearing 253, the bearing 253 is allowed to slightly upwards float on the surface of the cam. Thus, the surface of the cam can be protected from being damaged.

In the sixth to eighth embodiments, the locking means, such as the fixing screw, is removed from outside when a user uses the apparatus. The dust proofing characteristic in the apparatus can be maintained by attaching a cap or a seal to the hole in the casing.

The movable elements, such as the lens frame and the optical device holding member, can easily and roughly be located by an electrical sequence in the case of an electric drive structure. In the case where the movement is performed manually, a locking mechanism with respect to a predetermined position can be designed such that a click position or the like is used.

As described above, according to the present invention, an apparatus for switching the optical path for the optical microscope having a simple structure, exhibiting a low cost and permitted to be operated easily can be provided for a microscope of the type having a plurality of optical-device switching portions and arranged to obtain a required optical path by switching the switching portion while relating the switching portions to one another.

Moreover, a transportation locking apparatus for an optical-path switching apparatus for an optical microscope can be provided which is not broken due to impact during transportation and which always enables reliable switching to be performed.

An apparatus for switching the optical path for an optical microscope can be provided with which the transportation locking mechanism can easily and quickly be attached and detached from outside by a user while maintaining dust proofing characteristic and accuracy of the optical devices.

Additional advantages and modifications will readily occur to those skilled in the art. Therefore, the invention in its broader aspects is not limited to the specific details, and representative devices shown and described herein.

Accordingly, various modifications may be made without departing from the spirit or scope of the general inventive concept as defined by the appended claims and their equivalents.

What is claimed is:

1. An optical-path switching apparatus for an optical microscope, comprising:
   a plurality of optical devices, each of said plurality of optical devices being insertable into and removable from at least two or more switching positions provided for optical paths, so as to switch said optical paths;
   drive force generating means for generating a drive force;
   insertion/removal means for transmitting the drive force generated by said drive force generating means so as to insert and remove said plurality of optical devices into and from said switching positions while relating said plurality of optical devices to one another;
   control means for controlling switching of said optical devices to be performed by said insertion/removal means in order to obtain a required optical path;
   a plurality of guide members secured to positions in said optical microscope and at least one of which has a V-shape fixing groove for introducing and fixing said optical device; and
   a plurality of holding members supported by corresponding guide members among said plurality of guide members to hold corresponding optical devices among said plural optical devices,
   wherein:
   each of said holding members, corresponding to said at least one of said plurality of guide members having said V-shape fixing groove, has at least one fixing portion to be fixed to said V-shape fixing groove so as to be fixed to a corresponding fixing position relative to a corresponding guide member;
   said insertion/removal means includes:
      transmission means having a cam groove in a portion thereof and arranged to transmit a drive force generated by said drive force generating means; and
      a plurality of levers, each lever having an end received in said cam groove of said transmission means and another end fixed to said corresponding holding member with a predetermined movable space, said plurality of levers being arranged to transmit the drive force transmitted from said transmission means so as to move said corresponding holding member on said corresponding guide member;
   detection means is provided for detecting that at least one of said fixing portions has been moved to a corresponding inclined portion of said fixing groove; and
   said control means further comprises interruption means for interrupting generation of a drive force from said drive force generating means after a predetermined period of time has passed from detection of said fixing portion being moved to said inclined portion of said fixing groove by said detection means so as to position said fixing portion in said fixing groove.

2. An optical-path switching apparatus for an optical microscope according to claim 1, further comprising transportation locking means for restricting movement of at least one optical device among said plurality of optical devices in a moving direction.

3. An optical-device switching apparatus for an optical microscope, comprising:
   a plurality of optical devices, each of said plurality of optical devices being insertable into and removable from at least two or more switching positions provided for optical paths;
   drive force generating means for generating a drive force;
   insertion/removal means for transmitting the drive force generated by said drive force generating means so as to insert and remove said plurality of optical devices into and from said switching positions while relating said plurality of optical devices to one another;
   control means for controlling switching of said optical devices to be performed by said insertion/removal means;
   a plurality of guide members secured to positions in said optical microscope and at least one of which has a V-shape fixing groove for introducing and fixing said optical device; and
   a plurality of holding members supported by corresponding guide members among said plurality of guide members to hold corresponding optical devices among said plurality of optical devices,
   wherein:
   each of said holding members, corresponding to said at least one of said plurality of guide members having said V-shape fixing groove, has at least one fixing portion to be fixed to said V-shape fixing groove so as to be fixed to a corresponding fixing position relative to a corresponding guide member;
   said insertion/removal means includes:
      transmission means having a cam groove in a portion thereof and arranged to transmit a drive force generated by said drive force generating means; and
      a plurality of levers, each lever having an end received in said cam groove of said transmission means and another end fixed to said corresponding holding member with a predetermined movable space, said plurality of levers being arranged to transmit the drive force transmitted from said transmission means so as to move said corresponding holding member on said corresponding guide member;
   detection means is provided for detecting that at least one of said fixing portions has been moved to a corresponding inclined portion of said fixing groove; and
   said control means further comprises interruption means for interrupting generation of a drive force from said drive force generating means after a predetermined period of time has passed from detection of said fixing portion being moved to said inclined portion of said fixing groove by said detection means so as to position said fixing portion in said fixing groove.

4. An optical-device switching apparatus for an optical microscope according to claim 3, further comprising transportation locking means for restricting movement of at least one optical device among said plurality of optical devices in a moving direction.

5. An optical-path switching apparatus for an optical microscope for obtaining a required optical path by switching optical devices at respective switching positions on optical paths while relating said optical devices to one another, said optical-path switching apparatus for an optical microscope comprising:
   a first guide member secured in said optical microscope;
   a first holding member supported by said first guide member;
   a first optical device held by said first holding member;
   a second guide member secured in said optical microscope;

a second holding member supported by said second guide member;

a second optical device and a third optical device held by second holding member;

drive force generating means for generating a drive force;

transmission means having a cam groove in a portion thereof and arranged to transmit a drive force generated by said drive force generating means;

a first lever having an end received in said cam groove of said transmission means and another end fixed to said first holding member, said first lever being arranged to transmit the drive force transmitted from said transmission means so as to move said first holding member on said first guide member;

a second lever having an end received in said cam groove of said transmission means and another end fixed to said second holding member, said second lever being arranged to transmit the drive force transmitted from said transmission means so as to move said second holding member on said second guide member; and control means for controlling the drive force to be generated by said drive force generating means in order to obtain a required optical path.

6. An optical-path switching apparatus for an optical microscope according to claim 5, wherein:

at least one of said first holding member and said second holding member is provided with a fixing portion; and said guide member corresponding to said holding member provided with said fixing portion is provided with a groove for fixing said fixing portion.

7. An optical-path switching apparatus for an optical microscope according to claim 6, further comprising:

detection means for detecting that said fixing portion has been positioned in said groove, and wherein said control means further comprises interruption means for interrupting generation of a drive force from said drive force generating means after said detection means has detected that said fixing portion has been positioned in said groove.

8. An optical-path switching apparatus for an optical microscope according to claim 5, wherein:

said first holding member has at least one fixing portion;

said first guide member has at least one V-shape fixing groove for introducing and fixing said fixing portion;

said first holding member and said fixing portion of said first lever are fixed to each other with a predetermined movable space;

detection means is further provided which detects that said fixing portion has been positioned in an inclined portion of said fixing groove; and said control means further comprises interruption means for interrupting generation of a drive force from said drive force generating means after a predetermined period of time has passed from detection of said fixing portion being positioned in said inclined portion of said fixing groove by said detection means so as to position said fixing portion in said fixing groove.

9. An optical-path switching apparatus for an optical microscope according to claim 5, wherein:

said second holding member has at least one fixing portion;

said second guide member has at least one V-shape fixing groove for introducing and fixing said fixing portion;

said second holding member and said fixing portion of said second lever are fixed to each other with a predetermined movable space;

detection means is further provided which detects that said fixing portion has been positioned in an inclined portion of said fixing groove; and said control means further comprises interruption means for interrupting generation of a drive force from said drive force generating means after a predetermined period of time has passed from detection of said fixing portion being positioned in said inclined portion of said fixing groove by said detection means so as to position said fixing portion in said fixing groove.

10. An optical-path switching apparatus for an optical microscope according to claim 5, wherein:

said first holding member has at least one first fixing portion;

said first guide member has at least one first V-shape fixing groove for introducing and fixing said first fixing portion;

said first holding member and said fixing portion of said first lever are fixed to each other with a predetermined movable space;

first detection means is further provided which detects that said first fixing portion has been positioned in an inclined portion of said first fixing groove;

said control means further comprises first interruption means for interrupting generation of a drive force from said drive force generating means after a predetermined period of time has passed from detection of said at least one first fixing portion being positioned in said inclined portion of said at least one first fixing groove by said first detection means so as to position said first fixing portion in said first fixing groove;

said second holding member has at least one second fixing portion;

said second guide member has at least one second V-shape fixing groove for introducing and fixing said second fixing portion;

said second holding member and said fixing portion of said second lever are fixed to each other with a predetermined movable space;

second detection means is further provided which detects that said second fixing portion has been positioned in an inclined portion of said second fixing groove; and said control means further comprises second interruption means for interrupting generation of a drive force from said drive force generating means after a predetermined period of time has passed from detection of said at least one second fixing portion being positioned in said inclined portion of said at least one second fixing groove by said second detection means so as to position said second fixing portion in said second fixing groove.

11. An optical-path switching apparatus for an optical microscope according to claim 5, further comprising locking means for securing at least one of said first holding member and said second holding member.

12. An optical-path switching apparatus for an optical microscope according to claim 11, wherein:

said locking means secures at least one of said first holding member and said second holding member when a power source has been turned off, and suspends securing of said secured holding member when said power source has been turned on.

13. An optical microscope comprising an optical-path switching apparatus for switching optical paths used for one of reflected light and transmitted light from a specimen placed on a stare thereof, said optical-path switching apparatus comprising:

a plurality of optical devices, each of said plurality of optical devices being insertable into and removable from one of at least two or more switching positions provided for optical paths, so as to switch said optical paths;

drive force generating means for generating a drive force;

insertion/removal means for transmitting the drive force generated by said drive force generating means so as to insert and remove said plurality of optical devices into and from said switching positions while relating said plurality of optical devices to one another;

control means for controlling switching of said optical devices to be performed by said insertion/removal means in order to obtain a required optical path;

a plurality of guide members secured to positions in said optical microscope and at least one of which has a V-shape fixing groove for introducing and fixing said optical device; and a plurality of holding members supported by corresponding guide members among said plurality of guide members to hold corresponding optical devices among said plurality of optical devices, wherein:

each of said holding members, corresponding to said at least one of said plurality of guide members having said V-shape fixing groove, has at least one fixing portion to be fixed to said V-shape fixing groove so as to be fixed to a corresponding fixing position relative to a corresponding guide member;

said insertion/removal means includes:

transmission means having a cam groove in a portion thereof and arranged to transmit a drive force generated by said drive force generating means, and a plurality of levers, each lever having an end received in said cam groove of said transmission means and another end fixed to said corresponding holding member with a predetermined movable space, said plurality of levers being arranged to transmit the drive force transmitted from said transmission means so as to move said corresponding holding member on said corresponding guide member;

detection means is provided for detecting that at least one of said fixing portions has been moved to a corresponding inclined portion of said fixing groove; and said control means further comprises interruption means for interrupting generation of a drive force from said drive force generating means after a predetermined period of time has passed from detection of said fixing portion being moved to said inclined portion of said fixing groove by said detection means so as to position said fixing portion in said fixing groove.

14. An optical microscope according to claim 13, further comprising transportation locking means for restricting movement of at least one optical device among said plurality of optical devices in a moving direction.

15. An optical microscope comprising an optical-path switching apparatus for switching optical paths used for one of reflected light and transmitted light from a specimen placed on a stage thereof, said optical-path switching apparatus comprising:

a first guide member secured in said optical microscope;

a first holding member supported by said first guide member;

a first optical device held by said first holding member;

a second guide member secured in said optical microscope;

a second holding member supported by said second guide member;

a second optical device and a third optical device held by second holding member;

drive force generating means for generating a drive force;

transmission means having a cam groove in a portion thereof and arranged to transmit a drive force generated by said drive force generating means;

a first lever having an end received in said cam groove of said transmission means and another end fixed to said first holding member, said first lever being arranged to transmit the drive force transmitted from said transmission means so as to move said first holding member on said first guide member;

a second lever having an end received in said cam groove of said transmission means and another end fixed to said second holding member, said second lever being arranged to transmit the drive force transmitted from said transmission means so as to move said second holding member on said second guide member; and control means for controlling the drive force to be generated by said drive force generating means in order to obtain a required optical path.

16. An optical microscope according to claim 15, wherein:

at least one of said first holding member and said second holding member is provided with a fixing portion; and said guide member corresponding to said holding member provided with said fixing portion is provided with a groove for fixing said fixing portion.

17. An optical microscope according to claim 16, further comprising:

detection means for detecting that said fixing portion has been positioned in said groove, and wherein said control means further comprises interruption means for interrupting generation of a drive force from said drive force generating means after said detection means has detected that said fixing portion has been positioned in said groove.

18. An optical microscope according to claim 15, wherein:

said first holding member has at least one fixing portion;

said first guide member has at least one V-shape fixing groove for introducing and fixing said fixing portion;

said first holding member and said fixing portion of said first lever are fixed to each other with a predetermined movable space;

detection means is further provided which detects that said fixing portion has been positioned in an inclined portion of said fixing groove; and said control means further comprises interruption means for interrupting generation of a drive force from said drive force generating means after a predetermined period of time has passed from detection of said fixing portion being positioned in said inclined portion of said fixing groove by said detection means so as to position said fixing portion in said fixing groove.

19. An optical microscope according to claim 15, wherein:

said second holding member has at least one fixing portion;

said second guide member has at least one V-shape fixing groove for introducing and fixing said fixing portion;

said second holding member and said fixing portion of said second lever are fixed to each other with a predetermined movable space;

detection means is further provided which detects that said fixing portion has been positioned in an inclined portion of said fixing groove; and said control means further comprises interruption means for interrupting generation of a drive force from said drive force generating means after a predetermined period of time has passed from detection of said fixing portion being positioned in said inclined portion of said fixing groove by said detection means so as to position said fixing portion in said fixing groove.

20. An optical microscope according to claim 15, wherein:

said first holding member has at least one first fixing portion;

said first guide member has at least one first V-shape fixing groove for introducing and fixing said first fixing portion;

said first holding member and said fixing portion of said first lever are fixed to each other with a predetermined movable space;

first detection means is further provided which detects that said first fixing portion has been positioned in an inclined portion of said first fixing groove;

said control means further comprises first interruption means for interrupting generation of a drive force from said drive force generating means after a predetermined period of time has passed from detection of said at least one first fixing portion being positioned in said inclined portion of said at least first fixing groove by said first detection means so as to position said first fixing portion in said first fixing groove;

said second holding member has at least one second fixing portion;

said second guide member has at least one second V-shape fixing groove for introducing and fixing said second fixing portion;

said second holding member and said fixing portion of said second lever are fixed to each other with a predetermined movable space;

second detection means is further provided which detects that said second fixing portion has been positioned in an inclined portion of said second fixing groove; and said control means further comprises second interruption means for interrupting generation of a drive force from said drive force generating means after a predetermined period of time has passed from detection of said at least one second fixing portion being positioned in said inclined portion of said at least one second fixing groove by said second detection means so as to position said second fixing portion in said second fixing groove.

21. An optical microscope according to claim 15, further comprising locking means for securing at least one of said first holding member and said second holding member.

22. An optical microscope according to claim 21, wherein:

said locking means secures at least one of said first holding member and said second holding member when a power source has been turned off, and suspends securing of said secured holding member when said power source has been turned on.

23. An optical path switching apparatus for an optical microscope, comprising:

a plurality of optical devices, each of said plurality of optical devices being insertable into and removable from one of at least two or more switching positions provided for optical paths, so as to switch said optical paths;

a single drive source for generating a drive force;

insertion/removal means for transmitting the drive force generated by said single drive source so as to insert and remove said plurality of optical devices into and from said switching positions while relating said plurality of optical devices to one another; and control means for controlling switching of said optical devices to be performed by said insertion/removal means in order to obtain a required optical path;

wherein said insertion/removal means comprises:

transmission means having a cam groove in a portion thereof and arranged to transmit a drive force generated by said drive force generating means; and a plurality of levers each having an end received in said cam groove of said transmission means and another end fixed to a holding member of said optical device with a predetermined movable space so as to move said holding member.

24. An optical microscope comprising an optical-path switching apparatus for switching optical paths used for one of reflected light and transmitted light from a specimen placed on a stage thereof, said optical-path switching apparatus comprising:

a plurality of optical devices, each of said plurality of optical devices being insertable into and removable from one of at least two or more switching positions provided for said optical paths, so as to switch said optical paths;

a single drive source for generating a drive force;

insertion/removal means for transmitting the drive force generated by said single drive source so as to insert and remove said plurality of optical devices into and from said switching positions while relating said plurality of optical devices to one another; and control means for controlling switching of said optical devices to be performed by said insertion/removal means in order to obtain a required optical path;

wherein said insertion/removal means comprises:

transmission means having a cam groove in a portion thereof and arranged to transmit a drive force generated by said drive force generating means; and a plurality of levers each having an end received in said cam groove of said transmission means and another end fixed to a holding member of said optical device with a predetermined movable space so as to move said holding member.

\* \* \* \* \*